United States Patent
Wang

(10) Patent No.: US 10,686,998 B2
(45) Date of Patent: Jun. 16, 2020

(54) SYSTEMS AND METHODS FOR CHANGING OPERATION MODES OF THE OPTICAL FILTER OF AN IMAGING DEVICE

(71) Applicant: ZHEJIANG DAHUA TECHNOLOGY CO., LTD., Hangzhou, Zhejiang (CN)

(72) Inventor: Tingniao Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 16/260,332

(22) Filed: Jan. 29, 2019

(65) Prior Publication Data
US 2019/0174043 A1    Jun. 6, 2019

Related U.S. Application Data

(63) Continuation of application No. PCT/CN2017/094116, filed on Jul. 24, 2017.

(30) Foreign Application Priority Data

Jul. 29, 2016   (CN) .......................... 2016 1 0613028

(51) Int. Cl.
*H04N 5/238* (2006.01)
*G03B 7/14* (2006.01)
(Continued)

(52) U.S. Cl.
CPC ............. *H04N 5/238* (2013.01); *G03B 7/091* (2013.01); *G03B 7/0997* (2015.01); *G03B 7/14* (2013.01);
(Continued)

(58) Field of Classification Search
CPC .......... H04N 5/238; H04N 9/64; H04N 5/332; H04N 5/23245; H04N 5/2351; G03B 17/14; G03B 7/14
See application file for complete search history.

(56) References Cited

U.S. PATENT DOCUMENTS

| | | | |
|---|---|---|---|
| 9,386,230 B1 | 7/2016 | Duran et al. | |
| 2006/0244583 A1* | 11/2006 | Kawada | H04N 5/2254 340/468 |

(Continued)

FOREIGN PATENT DOCUMENTS

| | | |
|---|---|---|
| CN | 103533252 A | 1/2014 |
| CN | 103716527 A | 4/2014 |

(Continued)

OTHER PUBLICATIONS

International Search Report in PCT/CN2017/094116 dated Sep. 29, 2017, 4 pages.

(Continued)

*Primary Examiner* — Ahmed A Berhan
(74) *Attorney, Agent, or Firm* — Metis IP LLC

(57) ABSTRACT

A system includes a storage device storing a set of instructions and at least one processor in communication with the storage device. When executing the instructions, the at least one processor is configured to cause the system to obtain a first operation mode of the optical filter and determine a brightness value of visible light of ambient light. The at least one processor may also cause the system to obtain a brightness threshold related to the first operation mode, compare the brightness value of the visible light of the ambient light with the brightness threshold, and determine whether a switching condition is satisfied based on the comparison result. Upon the determination that the switching condition is satisfied, the at least one processor may further cause the (Continued)

system to switch the first operation mode of the optical filter to a second operation mode.

20 Claims, 13 Drawing Sheets

(51) Int. Cl.
| | |
|---|---|
| *G03B 7/0997* | (2014.01) |
| *H04N 5/232* | (2006.01) |
| *H04N 5/33* | (2006.01) |
| *H04N 5/235* | (2006.01) |
| *G03B 17/14* | (2006.01) |
| *H04N 9/64* | (2006.01) |
| *G03B 7/091* | (2006.01) |
| *H04N 5/225* | (2006.01) |
| *H04N 9/07* | (2006.01) |

(52) U.S. Cl.
CPC ......... *H04N 5/2254* (2013.01); *H04N 5/2351* (2013.01); *H04N 5/23245* (2013.01); *H04N 5/332* (2013.01); *H04N 9/07* (2013.01); *H04N 9/64* (2013.01)

(56) References Cited

U.S. PATENT DOCUMENTS

| | | | |
|---|---|---|---|
| 2012/0087645 A1* | 4/2012 | Wu | ................ H04N 5/33 396/439 |
| 2016/0127659 A1 | 5/2016 | Kawasaki | |
| 2019/0174043 A1 | 6/2019 | Wang | |

FOREIGN PATENT DOCUMENTS

| | | |
|---|---|---|
| CN | 104253976 A | 12/2014 |
| CN | 104301616 A | 1/2015 |
| JP | 2014121028 A | 6/2014 |

OTHER PUBLICATIONS

Written Opinion in PCT/CN2017/094116 dated Sep. 29, 2017, 5 pages.
First Office Action in Chinese Application No. 201610613028.1 dated Sep. 5, 2018, 6 pages.
The Extended European Search Report in European Application No. 17833509.7 dated Jun. 3, 2019, 4 Pages.

\* cited by examiner

SYSTEMS AND METHODS FOR CHANGING OPERATION MODES OF THE OPTICAL FILTER OF AN IMAGING DEVICE

CROSS-REFERENCE TO RELATED APPLICATIONS

This application is a Continuation of International Application No. PCT/CN2017/094116, filed on Jul. 24, 2017, which claims priority to Chinese Patent Application No. 201610613028.1 filed on Jul. 29, 2016, the content of which is hereby incorporated by reference to its entirety.

TECHNICAL FIELD

The present application generally relates to image acquisition technology, and more particularly, to systems and methods for changing operation modes of an optical filter of an imaging device.

BACKGROUND

An optical filter is a widely used component in an imaging device. The optical filter may have different operation modes that are suitable for different imaging scenarios (e.g., different periods of a day or different ambient light in the environment). The operation mode of the optical filter of the imaging device may need to be adjusted according to a particular imaging scenario. Thus, it may be desirable to develop systems and methods that may change operation modes of the optical filter of the imaging device automatically and efficiently.

SUMMARY

In one aspect of the present disclosure, a system may include a storage device storing a set of instructions and at least one processor in communication with the storage device. When executing the set of instructions, the at least one processor may be configured to cause the system to obtain a first operation mode of the optical filter and determine a brightness value of visible light of ambient light. The ambient light may include infrared light and the visible light. The at least one processor may also be configured to cause the system to obtain a brightness threshold related to the first operation mode and compare the brightness value of the visible light of the ambient light with the brightness threshold. The at least one processor may further be configured to cause the system to determine whether a switching condition is satisfied based on the comparison result. In response to the determination that the switching condition is satisfied, the at least one processor may further be configured to cause the system to switch the first operation mode of the optical filter to a second operation mode.

In some embodiments, the at least one processor may also be configured to cause the system to obtain a first image captured by the imaging device with visible light, a second image captured by the imaging device with infrared light, and a third image captured by the imaging device with the ambient light. The at least one processor may further be configured to cause the system to determine a first difference between the first image and the second image, a second difference between the second image and the third image, and a G value related to the third image based on the second difference. The at least one processor may further be configured to cause the system to obtain an exposure value of the imaging device and determine the brightness value of the visible light of the ambient light based on the first difference, the second difference, the G value, the exposure value.

In another aspect of the present disclosure, a method may include obtaining a first operation mode of the optical filter and determining a brightness value of visible light of ambient light. The ambient light may include infrared light and the visible light. The method may also include obtaining a brightness threshold related to the first operation mode and comparing the brightness value of the visible light of the ambient light with the brightness threshold. The method may further include determining whether a switching condition is satisfied based on the comparison result. In response to the determination that the switching condition is satisfied, the method may further include switching the first operation mode of the optical filter to a second operation mode.

In some embodiments, the method may also include obtaining a first image captured by the imaging device with visible light, a second image captured by the imaging device with infrared light, and a third image captured by the imaging device with the ambient light. The method may further include determining a first difference between the first image and the second image, a second difference between the second image and the third image, and a G value related to the third image based on the second difference. The method may further include obtaining an exposure value of the imaging device and determining the brightness value of the visible light of the ambient light based on the first difference, the second difference, the G value, the exposure value.

In some embodiments, the exposure value of the imaging device may include at least one of a shutter speed, a gain, or an aperture size.

In some embodiments, the first difference between the first image and the second image may be a Euclidean or Manhattan distance between the first image and the second image.

In some embodiments, the second difference between the second image and the third image may be a Euclidean or a Manhattan distance between the second image and the third image.

In some embodiments, the method may also include obtaining a first plurality of blocks of the first image, RGB data related to each block of the first plurality of blocks, and a first subset of blocks from the first plurality of blocks based on the RGB data related to each block of the first plurality of blocks. The method may further include determining a first average R/G value and a first average B/G value of the first subset of blocks of the first image, obtaining a second plurality of blocks of the second image; obtaining RGB data related to each block of the second plurality of blocks, and obtaining a second subset of blocks from the second plurality of blocks based on the RGB data related to each block of second plurality of blocks. The method may further include determining a second average R/G value and a second average B/G value of the second subset of blocks of the second image; and determining the first difference between the first image and the second image based on the first average R/G, the first average B/G, the second average R/G, and the second average B/G value.

In some embodiments, the method may also include obtaining a third plurality of blocks of the third image, RGB data related to each block of the third plurality of blocks, and a third subset of blocks from the third plurality of blocks based on the RGB data related to each block of the third plurality of blocks. The method may further include determining a third average R/G value and a third average B/G value of the third subset of blocks of the third image and determining the second difference between the second image and the third image based on the second average R/G, the second average B/G, the third average R/G, and the third average B/G value.

In some embodiments, the method may also include obtaining one or more brightness values of the visible light of the ambient light in a first period. The method may further include determining an average brightness value of the one or more brightness values of the visible light of the ambient light and determining the brightness threshold based on the average brightness value.

In some embodiments, the first operation mode of the optical filter may be a day-operation mode or a night-operation mode.

In some embodiments, the first operation mode of the optical filter may be the night-operation mode. The method may also include obtaining a plurality of brightness values of the visible light of the ambient light in a second period, and determining a first number of brightness values of the visible light of the ambient light exceeding or being equal to the brightness threshold among the plurality of brightness values of the visible light of the ambient light in the second period. The method may further include determining whether the first number is equal to or greater than a first number threshold, and switching the night-operation mode of the optical filter to the day-operation mode in response to the determination that the first number is equal to or greater than the first number threshold.

In some embodiments, the first operation mode of the optical filter may be the day-operation mode. The method may also include obtaining a plurality of brightness values of the visible light of the ambient light in a third period, and determining a second number of brightness values of the visible light of the ambient light below the brightness threshold among the plurality of brightness values of the visible of the ambient light in the third period. The method may further include determining whether the second number is equal to or greater than a second number threshold; and switching the day-operation mode of the optical filter to the night-operation mode in response to the determination that the second number is equal to or greater than the second number threshold.

According to yet another aspect of the present disclosure, a non-transitory machine-readable storage medium storing instructions that, when executed by at least one processor of a system, may be configured to cause the system to perform a method. The method may include obtaining a first operation mode of the optical filter and determining a brightness value of visible light of ambient light, the ambient light including infrared light and the visible light. The method may also include obtaining a brightness threshold related to the first operation mode and comparing the brightness value of the visible light of the ambient light with the brightness threshold. The method may further include determining whether a switching condition is satisfied based on the comparison result. In response to the determination that the switching condition is satisfied, the method may further include switching the first operation mode of the optical filter to a second operation mode.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2:
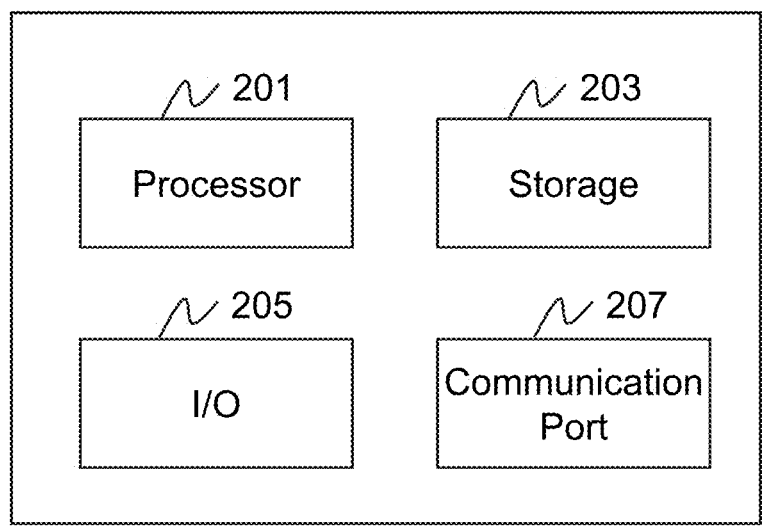
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An optical filter is a widely used component in an imaging device. The optical filter may have different operation modes that are suitable for different imaging scenarios. For example, the optical filter may have a day-operation mode and a night-operation mode. The day-operation mode may be suitable for an imaging scenarios with sufficient brightness value. The night-operation mode may be suitable for an imaging scenarios without sufficient brightness value. As used herein, "sufficient brightness value" refers to a brightness value of ambient light in the imaging scenarios is equal to or greater than a brightness threshold.

An aspect of the present disclosure relates to systems and methods for changing operation modes of an optical filter of an imaging device based on a brightness value of visible light of ambient light. The ambient light may be referred herein as to a source of light that may be available naturally and not explicitly supplied by a user for taking images in the imaging scenario. The ambient light may include infrared light and the visible light. A first operation mode (e.g., an operation mode at the present moment) of an optical filter of an imaging device may be obtained. A brightness threshold related to the first operation mode of the optical filter may be obtained. The brightness value of the visible light of the ambient light may be compared with the brightness threshold. A determination whether the comparison result satisfies a switching condition may be made. In response to the determination that the switching condition is satisfied, the first operation mode of the optical filter may be switched to a second operation mode. As such, the operation mode of the optical filter may be changed to adapt different imaging scenarios automatically and efficiently.

Figure 1:
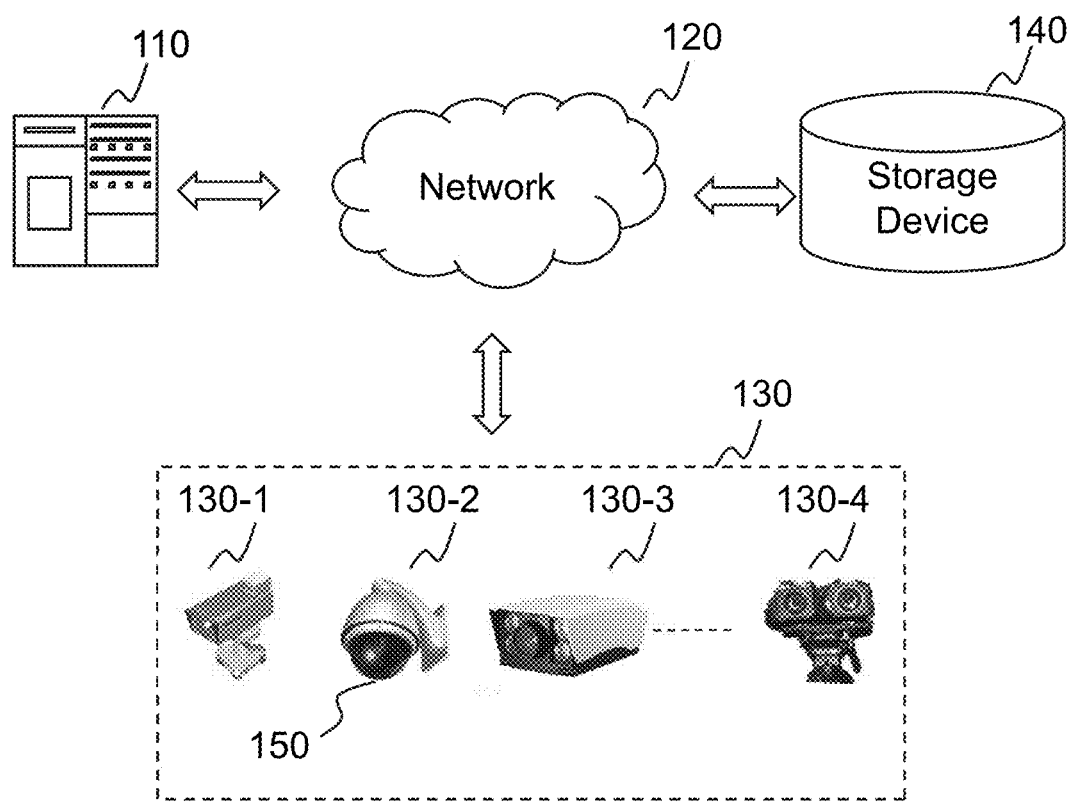
FIG. 1 is a schematic diagram of an exemplary image acquisition system according to some embodiments of the present disclosure.

FIG. 1 illustrates a schematic diagram of an exemplary image acquisition system according to some embodiments of the present disclosure. As shown, the image acquisition system 100 may include a server 110, a network 120, an image acquisition device 130, a storage device 140, and an optical filter. The image acquisition system 100 may be used in various fields including, for example, photography, filming, monitoring, and detection.

The server 110 may process information and/or data relating to the image acquisition system 100 to perform one or more functions described in the present disclosure. In some embodiments, the server 110 may include one or more processing devices (e.g., single-core processing device(s) or multi-core processor(s)). Merely by way of example, the processing device may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The server 110 may be a single server or a server group. The server group may be centralized, or distributed (e.g., server 110 may be a distributed system). In some embodiments, the server 110 may be local or remote. For example, the server 110 may access information and/or data stored in the image acquisition device 130, and/or the storage device 140 via the network 120. As another example, the server 110 may be directly connected to the image acquisition device 130, and/or the storage device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 of the present disclosure.

The network 120 may include any suitable network that can facilitate exchange of information and/or data for the image acquisition system 100. In some embodiments, one or more components in the image acquisition system 100 (e.g., the server 110, the image acquisition device 130, and the storage device 140) may send information and/or data to another component(s) in the image acquisition system 100 via the network 120. For example, the server 110 may obtain/acquire an image from the image acquisition device 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

The image acquisition device 130 may be and/or include any suitable device that is capable of acquiring image data. Exemplary image acquisition device 130 may include a camera (e.g., a digital camera, an analog camera, an IP camera (IPC), etc.), a video recorder, a scanner, a mobile phone, a tablet computing device, a wearable computing device, an infrared imaging device (e.g., a thermal imaging device), or the like. In some embodiments, the image acquisition device 130 may include a gun camera 130-1, a dome camera 130-2, an integrated camera 130-3, a binocular camera 130-4, a monocular camera, etc. In some embodiments, the camera may be a visible light camera or a thermal imaging camera.

Image data may include an image, or any data about an image, such as values of one or more pixels (or referred to as pixel values) of an image (e.g., luma, gray values, intensities, chrominance, contrast of one or more pixels of an image), RGB data, audio information, timing information, location data, etc. In some embodiments, the image acquisition device 130 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

In some embodiments, the image acquisition device 130 may include an optical filter. For example, the dome camera 130-2 may include an optical filter 150. For illustration purposes only, only one optical filter 150 is labelled in the dome camera 130-2, but other types of the image acquisition device 130 (e.g., 130-1, 130-3, 130-4) may also include an optical filter. The optical filter 150 may selectively transmit light of different wavelengths. The optical filter 150 may be an infrared cut-off optical filter, a monochromatic optical filter, a dichroic optical filter, a metal mesh optical filter, an all-pass optical filter, or the like, or any combination thereof. Different types of optical filters may have different transmission characteristics of light. For example, the infrared cut-off optical filter may cut off infrared light and transmit visible light. The all-pass optical filter may transmit any types of light, such as radio light, microwave light, infrared light, visible light, ultraviolet light, X-rays.

In some embodiments, the optical filter 150 may include one or more types of optical filters. A type of the optical filters may correspond to an operation mode of the optical filter 150. Exemplary operation modes of optical filter 150 may include a day-operation mode, a night-operation mode, an indoor-operation mode, or outdoor-operation mode, or the like, or any combination thereof. When operating in different operation modes, the optical filter 150 may have different transmission characteristics of light. For example, in the infrared cut-off operation mode, the optical filter may cut off infrared light and transmit visible light. The operation mode of the optical filter 150 may be set manually or be determined by one or more components of the image acquisition system 100 (e.g., the server 110). Merely by way of example, the operation mode of optical filter 150 may be switched by a user via the image acquisition device 130. As another example, the operation mode of optical filter 150 may be determined by the server 110 based on the imaging scenarios (e.g., a brightness value of visible light of ambient light) when taking an image.

In some embodiments, the image acquisition device 130 may include a processing device (not shown in FIG. 1). The processing device may process information and/or data relating to the image acquisition device 130 to perform one or more functions described in the present disclosure. In some embodiments, the processing device may be implemented on a computing device 200 having one or more components illustrated in FIG. 2 of the present disclosure.

In some embodiments, the image data acquired by the image acquisition device 130 may be displayed on a terminal (not shown in FIG. 1). The terminal may include a tablet computer, a laptop computer, a mobile phone, a personal digital assistance (PDA), a smart watch, a point of sale (POS) device, a virtual reality (VR), an augmented reality (AR), an onboard computer, an onboard television, a wearable device, or the like, or any combination thereof.

The storage device 140 may store data and/or instructions. The data and/or instructions may be obtained from, for example, the server 110, the image acquisition device 130, and/or any other component of the image acquisition system 100.

In some embodiments, the storage device 140 may store data and/or instructions that the server 110 may execute or use to perform exemplary methods described in the present disclosure. In some embodiments, storage device 140 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components of the image acquisition system 100 (e.g., the server 110, the image acquisition device 130, etc.). One or more components of the image acquisition system 100 may access the data or instructions stored in the storage device 140 via the network 120. In some embodiments, the storage device 140 may be directly connected to or communicate with one or more components of the image acquisition system 100 (e.g., the server 110, the image acquisition device 130, etc.). In some embodiments, the storage device 140 may be part of the server 110 or the image acquisition device 130.

In some embodiments, one or more components of the image acquisition system 100 (e.g., the server 110, the image acquisition device 130, etc.) may have a permission to access the storage device 140. In some embodiments, one or more components of the image acquisition system 100 may read and/or modify information relating to the image when one or more conditions are met. For example, the server 110 or the image acquisition device 130 may read and/or modify operation modes of the optical filter 150 in various application scenario.

It should be noted that the above description is merely provided for the purposes of illustration, and not intended to limit the scope of the present disclosure. For persons having ordinary skills in the art, multiple variations and modifications may be made under the teachings of the present disclosure. For example, the image acquisition system 100 may include one or more terminals. As another example, the processing device may be integrated into the image acquisition device 130. However, those variations and modifications do not depart from the scope of the present disclosure.

FIG. 2 is a schematic diagram illustrating exemplary hardware and/or software components of an exemplary computing device 200 on which the server 110 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (e.g., program code) and perform functions of the image acquisition system 100 in accordance with techniques as described elsewhere in the present disclosure. The computer instructions may include, for example, routines, programs, objects, components, data structures, procedures, modules, and functions, which perform particular functions as described elsewhere in the present disclosure. For example, the processor 201 may determine one or more exposure values of the image acquisition device 130. In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor may be described in the computing device 200. However, it should be noted that the computing device 200 of the present disclosure may also include multiple processors, and thus operations and/or method steps that are performed by one processor as described in the present disclosure may also be jointly or separately performed by the multiple processors. For example, if in the present disclosure the processor of the computing device 200 executes both operations A and operation B, it should be understood that operation A and operation B may also be performed by two or more different processors jointly or separately in the computing device 200 (e.g., a first processor executes operation A and a second processor executes operation B, or vice versa, or the first and second processors jointly execute operations A and B).

The storage 203 may store data/information obtained from the server 110, the image acquisition device 130, and/or any other component of the image acquisition system 100. In some embodiments, the storage 203 may include a mass storage, removable storage, a volatile read-and-write memory, a read-only memory (ROM), or the like, or any combination thereof. For example, the mass storage may include a magnetic disk, an optical disk, solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for switching operation modes of an optical filter of the image acquisition device 130.

The I/O 205 may input and/or output signals, data, information, etc. In some embodiments, the I/O 205 may enable a user interaction with the processing device. In some embodiments, the I/O 205 may include or communicate with an input device and an output device to facilitate communication between the processing device and an input device or an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 207 may be connected to a network (e.g., the network 120) to facilitate data communications. The communication port 207 may establish connections between the server 110, the image acquisition device 130, and/or any other component of the image acquisition system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 207 may be and/or include a standardized communication port, such as RS232, RS485, etc. In some embodiments, the communication port 207 may be a specially designed communication port. For example, the communication port 207 may be designed in accordance with the digital imaging and communications in medicine (DICOM) protocol.

Figure 3:
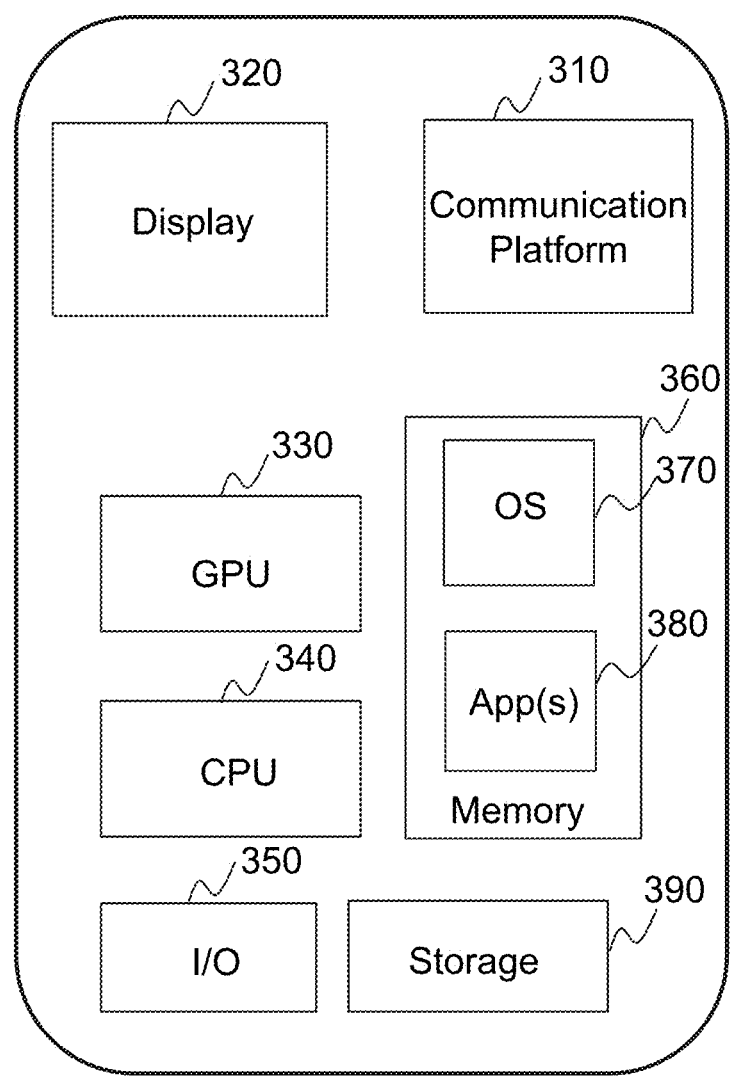
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the image acquisition device 130 may be implemented according to some embodiments of the present disclosure. As illustrated in FIG. 3, the mobile device 300 may include a communication port 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device. User interactions with the information stream may be achieved via the I/O 350 and provided to the processing device and/or other components of the image acquisition system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
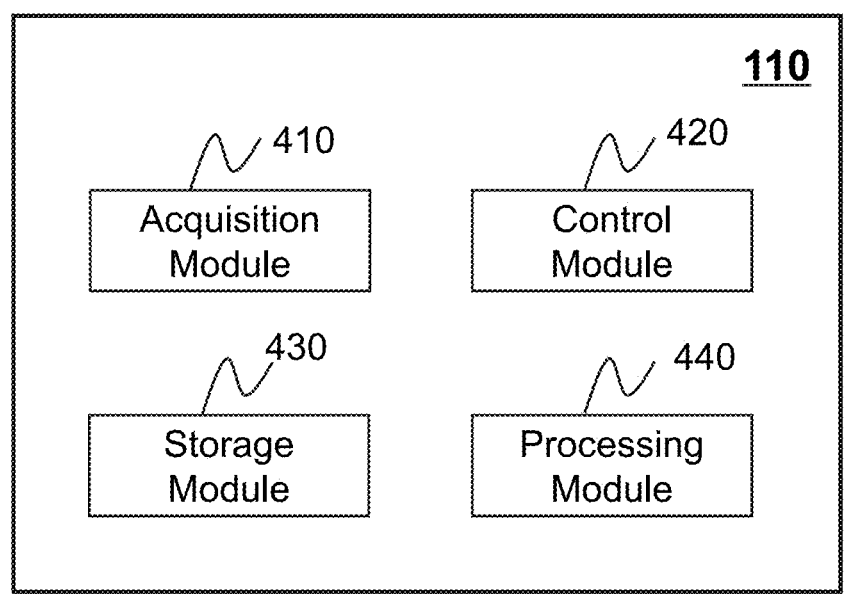
FIG. 4 is a block diagram illustrating an exemplary server according to some embodiments of the present disclosure.

FIG. 4 is a block diagram illustrating an exemplary server 110 according to some embodiments of the present disclosure. The server 110 may include an acquisition module 410, a control module 420, a storage module 430, and a processing module 440. At least two components of the server 110 may be connected to or communicated with each other and/or other components of the image acquisition system 100, for example, the storage 140. In some embodiments, the server 110 may be implemented on the computing device 200 illustrated in FIG. 2.

Generally, the terms "module," "unit," and/or "engine" used herein, refers to logic embodied in hardware or firmware, or to a collection of software instructions. The modules, units, and engines described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices (e.g., processor 201 or CPU 340) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

The acquisition module 410 may acquire data and/or an instruction related to the image acquisition system 100. The data and/or the instruction may include one or more images captured by the image acquisition device 130, operation information of the image acquisition device 130, an instruction input by a user via the image acquisition device 130, or the like, or any combination thereof. The data or instruction may be acquired from other components of the image acquisition system 100 (e.g., retrieved from the storage 140 or the image acquisition device 130 via the network 120) or generated by other components in the server 110 (e.g., the processing module 440).

The control module 420 may control operations of one or more components of the image acquisition system 100, such as the acquisition module 410, the storage module 430, and/or the processing module 440 (e.g., by generating one or more control parameters). For example, the control module 420 may control the acquisition module 410 to acquire image data or a set of instructions, etc. As another example, the control module 420 may control the processing module 440 to process image data acquired by the acquisition module 410. In some embodiments, the control module 420 may receive a real-time command or retrieve a predetermined command provided by a user (e.g., a photographer) to control one or more operations of the acquisition module 410 and/or the processing module 440. For example, the control module 420 can adjust the acquisition module 410 and/or the processing module 440 to generate images of a subject according to the real-time command and/or the predetermined command. In some embodiments, the control module 420 may communicate with one or more other modules of the server 110 for exchanging information and/or data.

The storage module 430 may store image data, exposure value, a real-time command or retrieve a predetermined command provided by a user, or the like, or a combination thereof. In some embodiments, the storage 430 may store one or more programs and/or instructions that may be executed by the processor(s) of the processing engine to perform exemplary methods described in this disclosure. For example, the storage 430 may store program(s) and/or instruction(s) that can be executed by the processor(s) of the processing engine to acquire operation modes of an optical filter of an imaging device.

The processing module 440 may process information provided by various modules of the server 110. For example, the processing module 440 may process image data acquired by the acquisition module 410 and/or image data retrieved from the storage module 430.

In some embodiments, one or more modules illustrated in FIG. 4 may be implemented in at least part of the exemplary image acquisition system 100 as illustrated in FIG. 1. For example, the one or more modules of the server 110 may be integrated into a processing device. As another example, one or more modules of the server 110 may be integrated into the image acquisition device 130.

It should be noted that the above descriptions of the server 110 are merely provided for the purposes of illustration, and not intended to limit the scope of the present disclosure. For persons having ordinary skills in the art, various modifications and changes in the forms and details of the application of the above method and system may occur without departing from the principles of the present disclosure. For example, the acquisition module 410 and the processing module 440 may form a module to acquire and process data related to the image acquisition system 100. However, those variations and modifications also fall within the scope of the present disclosure.

Figure 5:
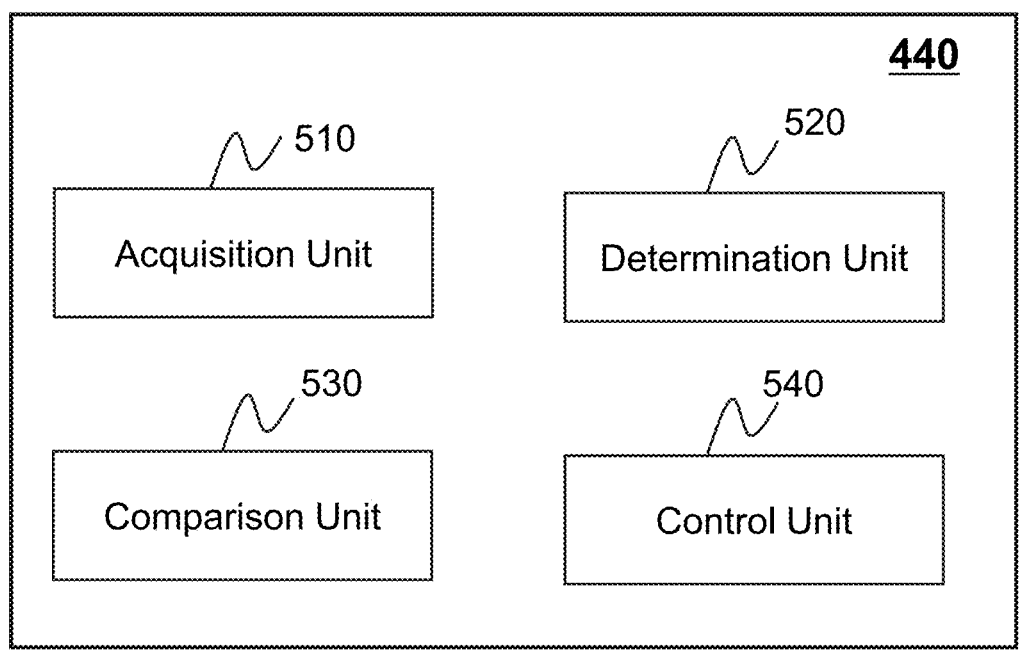
FIG. 5 is a block diagram illustrating an exemplary processing module according to some embodiments of the present disclosure.

FIG. 5 is a block diagram illustrating an exemplary processing module 440 according to some embodiments of the present disclosure. The processing module 440 may include an acquisition unit 510, a determination unit 520, a comparison unit 530, and a control unit 540. The processing module 440 may be implemented on various components (e.g., the processor 210 of the computing device 200 as illustrated in FIG. 2).

The acquisition unit 510 may obtain data related to the image acquisition system 100 (e.g., data related to an imaging device of the image acquisition system 100). For example, the acquisition unit 510 may obtain data related to the optical filter 150 of an imaging device. The data related to the optical filter 150 may include an operation mode, operation information, a brightness threshold related to an operation mode of the optical filter 150, or the like, or any combination thereof.

As another example, the acquisition unit 510 may obtain image data related to the imaging device. The image data may include one or more images captured by the imaging device, RGB data of the images captured by the imaging device, or the like, or any combination thereof. Additionally or alternatively, the acquisition unit 510 may obtain a plurality of blocks of the images captured by the imaging device and/or image data related to the blocks of the images. More descriptions regarding the data related to acquisition system 100 may be found elsewhere in the present disclosure (e.g., FIGS. 6 to 8 and the relevant descriptions).

The determination unit 520 may determine one or more values related to the image acquisition system 100. The one or more values may include a brightness value of visible light of ambient light, a brightness threshold related to an operation mode of the optical filter 150, a difference between two images, or the like, or any combination thereof. More descriptions regarding determination of the values related to the imaging acquisition system 100 may be found elsewhere of the present disclosure (e.g., FIGS. 6 to 9 and the relevant descriptions).

Additionally or alternatively, the determination unit 520 may determine whether a switching condition of the optical filter 150 is satisfied based on a comparison result generated by the comparison unit 530. The switching condition may be a default condition stored in a storage device (e.g., the storage device 140) or be set by a user of the imaging device. Upon the determination that the switching condition is satisfied, the determination unit 520 may transmit an instruction to the control module 540 to switch the operation mode of the optical filter 150.

The comparison unit 530 may make comparison between two values and/or generate a comparison result. For example, the comparison unit 530 may compare a brightness value of visible light of ambient light with a brightness threshold to generate a comparison result. In some embodiments, the comparison result may be a difference between the brightness value of the visible light of the ambient and the brightness threshold.

The control unit 540 may control the operation mode of the optical filter 150 of an imaging device. For example, the optical filter 150 may operate in a day-operation mode, and the control unit 540 may switch the optical filter 150 from the day-operation mode to a night-operation mode. As another example, the optical filter 150 may operate in the night-operation mode, and the control unit 540 may switch the optical filter 150 from the night-operation mode to the day-operation mode. In some embodiments, the comparison unit 540 may control the optical filter 150 to change its operation mode if a switch condition is satisfied.

It should be noted that the above descriptions of FIGS. 4 to 5 are provided for the purposes of illustration, and not intended to limit the scope of the present disclosure. For persons having ordinary skills in the art, various modifications and changes in the forms and details of the application of the above method and system may occur without departing from the principles of the present disclosure.

In some embodiments, the server 110 and/or the processing module 440 may include one or more other modules. For example, the server 110 may include a storage module to store data generated by the modules in the server 110. In some embodiments, one or more modules of the server 110 and/or the processing module 440 may be omitted. In some embodiments, one module may perform the functions of two or more modules described above. However, those variations and modifications also fall within the scope of the present disclosure.

Figure 6:
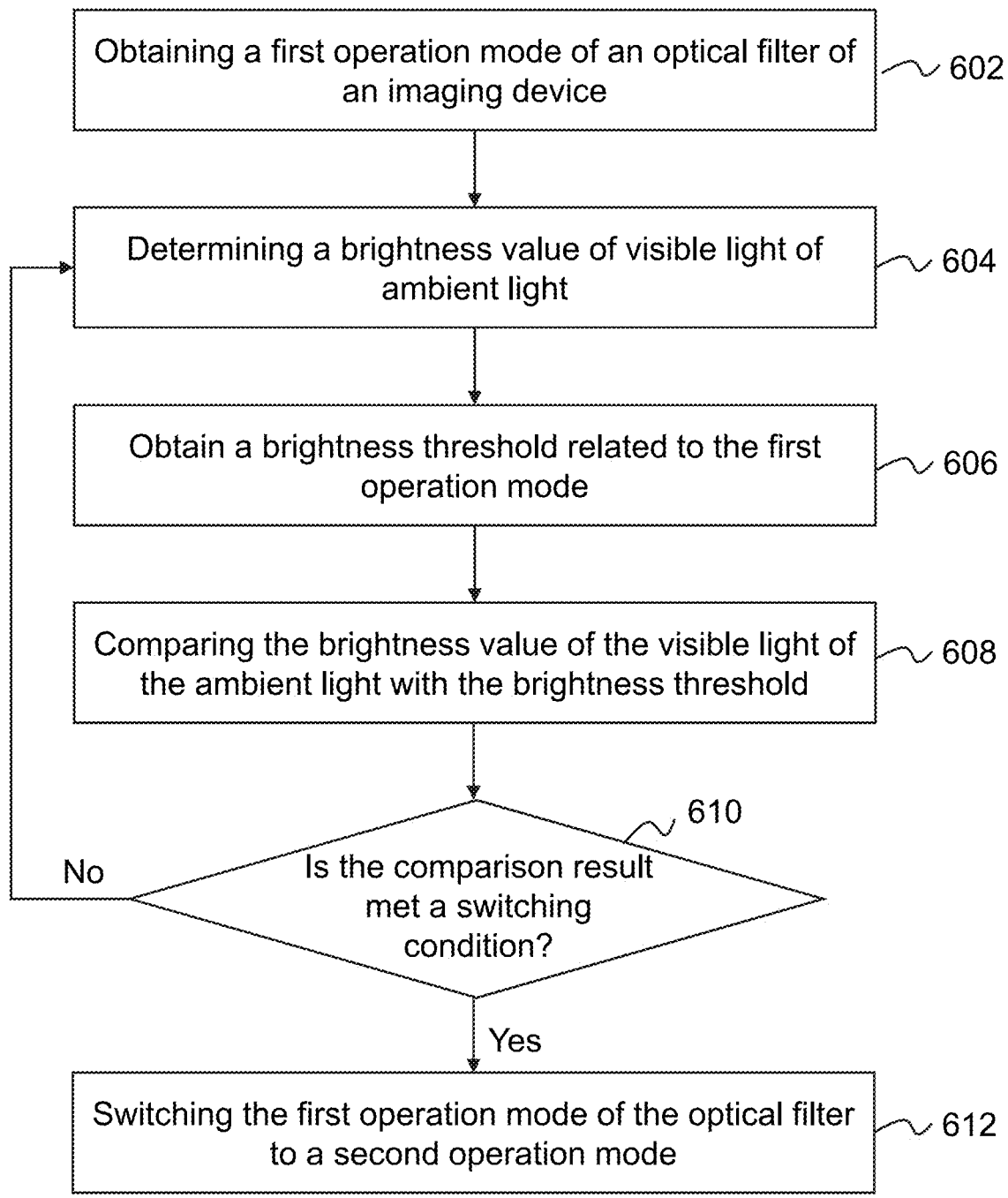
FIG. 6 is a flowchart of an exemplary process for switching an operation mode of an optical filter according to some embodiments of the present disclosure.

FIG. 6 is a flowchart of an exemplary process for switching an operation mode of an optical filter according to some embodiments of the present disclosure. In some embodiments, at least part of process 600 may be performed by the server 110 (implemented in, for example, the processor 201 of the computing device 200 shown in FIG. 2).

In 602, the acquisition unit 510 may obtain a first operation mode of the optical filter 150 of an imaging device. The imaging device may be the image acquisition device 130 (e.g., a gun camera 130-1, a dome camera 130-2, an integrated camera 130-3, a binocular camera 130-4, a monocular camera, etc.) described in connection with FIG. 1. The optical filter 150 may selectively transmit light of different wavelengths. The optical filter 150 may be an infrared cut-off optical filter, a monochromatic optical filter, a dichroic optical filter, a metal mesh optical filter, an all-pass optical filter, or the like, or any combination thereof. Different types of optical filters may have different transmission characteristics of light. For example, the infrared cut-off optical filter may cut off the infrared light and transmit visible light. The visible light may be light whose wavelength is in a range of 400 nm to 700 nm. The infrared light may be light whose wavelength is in a range of 700 nm to 1000 nm (as an example illustrated in FIG. 10). The all-pass optical filter may transmit any types of light, such as radio light, microwave light, infrared light, visible light, ultraviolet light, X-rays light and rays.

In some embodiments, the optical filter 150 may include at least two types of optical filters. A type of the optical filter may correspond to an operation mode of the optical filter 150. For example, the at least two types of optical filters may be the infrared cut-off optical filter and the all-pass optical filter. The optical filter 150 may have two corresponding operation modes; that is, the infrared cut-off operation mode and the all-pass operation mode.

The imaging device may capture an image in an imaging scenario under ambient light. The ambient light herein refers to a source of light that may be available naturally and not explicitly supplied by a user for the purpose of taking images in the imaging scenario. The ambient light may include infrared light and visible light.

The quality of the image captured by the imaging device may be associated with a brightness value of the ambient light. The brightness value of the ambient light may be associated with a brightness value of the visible light and a brightness value of the infrared light. In the daytime, the brightness of the visible light of the ambient light is sufficient for the imaging device to obtain an image with a high or desirable quality (e.g., the brightness of the image being equal to or greater than a threshold). The optical filter 150 may operate in the infrared cut-off operation mode to cut off the infrared light in the ambient light. At night, the brightness of the visible light of the ambient light may not be sufficient for the imaging device to obtain the image with high or describable quality. The optical filter 150 may operate in the all-pass operation mode to transmit the visible light and the infrared light in the ambient light. Accordingly, the infrared cut-off operation mode may also be referred herein as a day-operation mode, and the all-pass operation mode may also be referred herein as a night-operation mode.

In some embodiments, the first operation mode may be the operation mode of the optical filter 150 at the present moment or at a defined time reasonably close to the present moment. The acquisition unit 510 may obtain and/or determine the first operation mode of the optical filter 150 according to operation information of the optical filter 150. The operation information may include the information related to the operation mode of the optical filter 150 at the present moment or at the defined time reasonably close to the present moment. The acquisition unit 510 may obtain the operation information of the optical filter 150 from a component of the image acquisition system 100, such as the storage device 140, the image acquisition device 130, or the storage module 430.

In 604, the determination unit 520 may determine a brightness value of visible light of ambient light. In some embodiments, the determination unit 520 may determine the brightness value of the visible light of the ambient light based on one or more images captured by the imaging device under the first operation mode of the optical filter 150 and one or more exposure values of the imaging device. More descriptions regarding the determination of the brightness value of the visible light of the ambient light may be found elsewhere of the present disclosure (e.g., FIG. 7 and the relevant descriptions).

In 606, the acquisition unit 510 may obtain a brightness threshold related to the first operation mode. In some embodiments, the brightness threshold related to the first operation mode may be a default parameter stored in a storage device (e.g., the storage device 140) or a parameter set by a user of the imaging device. Additionally or alternatively, the brightness threshold may be determined by one or more components (e.g., the determination unit 520) of the image acquisition system 100.

In some embodiments, the determination unit 520 may determine the brightness threshold based on one or more brightness values of the visible light of the ambient light in a period. For example, the brightness threshold may be a threshold determined according to the one or more brightness values in the period, such as an average value of the one or more brightness values, a median value of the one or more brightness values, a ratio of the average value of the one or more brightness values. In some embodiments, the brightness threshold may be determined according to one or more operations in process 900 (e.g., FIG. 9 and the relevant descriptions).

The first operation mode of the optical filter 150 may be the day-operation mode, the night-operation mode, or the like described in connection with step 602. The brightness thresholds related to different operation modes may be the same as or different from each other. The determination of the brightness thresholds related to different modes may be the same as or different from each other.

Merely by way of example, the brightness threshold related to the night-operation mode may be a default parameter retrieved by the acquisition unit 510 from the storage device 140. The brightness threshold related to the day-operation mode may be a threshold determined by the determination unit 520. As another example, the brightness threshold related to the night-operation mode or the day-operation mode may be thresholds determined by the determination unit 520 according to one or more operations in process 900 (e.g., FIG. 9 and the relevant descriptions).

In 608, the comparison unit 530 may compare the brightness value of the visible light of the ambient light with the brightness threshold to generate a comparison result. For example, the comparison unit 530 may compare the numerical values of the brightness value with the brightness threshold. In some embodiments, the comparison unit 530 may determine a difference between the brightness value and the brightness threshold. The comparison unit 530 may designate the determined difference as a result of the comparison.

In some embodiments, in 604, the determination unit 520 may obtain a plurality of brightness values of the visible light of the ambient light in a period. The comparison unit 530 may compare each of the plurality of brightness values of the visible light of the ambient light with the brightness threshold to generate the comparison result. For example, when the first operation mode of the optical filter 150 is the night-operation mode, the comparison unit 530 may obtain a first number of brightness values of the visible light of the ambient light of the plurality of brightness values exceeding or being equal to the brightness threshold. The comparison unit 530 may also designate the first number as the comparison result.

When the first operation mode of the optical filter 150 is the day-operation mode, the comparison unit 530 may obtain a second number of brightness values of the visible light of the ambient light of the plurality of brightness values below the brightness threshold. The comparison unit 530 may also designate the second number as the comparison result.

In 610, the determination unit 520 may determine whether a switching condition is satisfied based on the comparison result. The switching condition may be a default condition stored in a storage device (e.g., the storage device 140) or be set by a user of the imaging device. Upon the determination that the switching condition is satisfied, the process 600 may proceed to 612. On the other hand, upon the determination that the switching condition is not satisfied, the process 600 may proceed to 604, and steps 604 to 608 may be performed.

The switching condition may include a switching threshold associated with the comparison result. For example, the comparison result may be the difference between the brightness value and the brightness threshold described in connection with 608. The switching condition may be whether the difference between the brightness value and the brightness threshold is equal to or greater than a difference threshold.

For instance, the determination unit 520 may determine whether the difference between the brightness value and the brightness threshold is equal to or greater than a difference threshold. Upon the determination that the difference between the brightness value and the brightness threshold is equal to or greater than the difference threshold, the process 600 may proceed to 612. On the other hand, upon the determination that the difference between the brightness value and the brightness threshold is smaller than the difference threshold, the process 600 may proceed to 604, and steps 604 to 608 may be performed.

As another example, if the first operation mode is the night-operation mode, the comparison result may be the first number of brightness values of the visible light of the ambient light of the plurality of brightness values exceeding or being equal to the brightness threshold. The switching condition may be whether the first number is equal to or greater than a first number threshold. As yet another example, if the first operation mode is the day-operation mode, the comparison result may be the second number of brightness values of the visible light of the ambient light of the plurality of brightness values below the brightness threshold. The switching condition may be whether the second number is equal to or greater than a second number threshold. The first number threshold or the second number threshold may be a default parameter stored in a storage device (e.g., the storage device 140) or a parameter set by a user of the imaging device.

In 612, the control unit 540 may switch the first operation mode of the optical filter 150 to a second operation mode. Merely by way of example, the first operation mode may be the night-operation mode and the second operation mode may be the day-operation mode. Upon the determination that the switching condition is satisfied, the control unit 540 may switch the night-operation mode to the day-operation mode.

Alternatively, the first operation mode may be the day-operation mode and the second operation mode may be the night-operation. Upon the determination that the switching condition is satisfied, the control unit 540 may switch the day-operation mode to the night-operation mode.

It should be noted that the above descriptions of the process 600 are provided for the purposes of illustration and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure.

In some embodiments, the order of the operations in process 600 may be changed. For example, 602 and 606 may be performed simultaneously. As another example, 606 may be performed before 604. In some embodiments, in 604, the determination unit 520 may determine a plurality of brightness value of visible light of ambient light. In 604, the determination unit 520 may determine the brightness threshold related to the first operation mode by performing one or more operations of process 900 illustrated in FIG. 9.

In some embodiments, if the first operation mode is the day-operation mode, the determination unit 520 may determine the brightness value of the visible light of the ambient light based on an image captured by the imaging device in the day-operation mode. The brightness value of the visible light may be equal to a brightness value of the image taken in the day-operation mode. The brightness threshold of related to the day-operation mode may be a default parameter stored in a storage device (e.g., the storage device 140) or a parameter set by a user of the imaging device.

In some embodiments, the brightness value of an image may be determined by the determination module 520 according to the RGB data of the image. For example, the determination module 520 may assign the R value, the G value, or the B value of the image as the brightness value of the image. Alternatively or additionally, the determination module 520 may convert the RGB data of the image to Luminance-Bandwidth-Chrominance (YUV) data, and determine the brightness value of the image based on the YUV data. For instance, the determination module 520 may assign the luma (i.e., Y) value as the brightness value of the image.

Additionally or alternatively, the brightness value of the visible light may be a value determined based on brightness values of a plurality of images taken in the day-operation mode. The plurality of images may be captured by the imaging device in a predetermined time frame, such as in every 2 seconds. The brightness value of the visible light may be equal to an average brightness value, a median brightness value or any other values determined based on the brightness values of the plurality of images.

The brightness threshold related to the night-operation mode may be determined based on the image taken in the day-operation mode, the brightness threshold related to the day-operation mode, and an image taken in the night-operation mode, as described in Equation (1) below:

$$\text{Threshold}_1 = Lu_2 + (\text{Threshold}_0 - Lu_1)*\alpha + \varepsilon \qquad \text{Equation (1)},$$

where $\text{Threshold}_1$ refers to the brightness threshold related to night-operation mode, $\text{Threshold}_0$ refers to the brightness threshold related to day-operation mode, $Lu_2$ refers to a brightness value of the image captured by the imaging device in the night-operation mode, $Lu_1$ refers to the brightness value of the image captured by the imaging device in the day-operation mode, and $\alpha$ refers to a sum of 1 and a ratio of a brightness value of infrared light and a brightness of visible light. $\varepsilon$ refers to a tolerance value of the brightness, which may be any suitable positive value.

Figure 7:
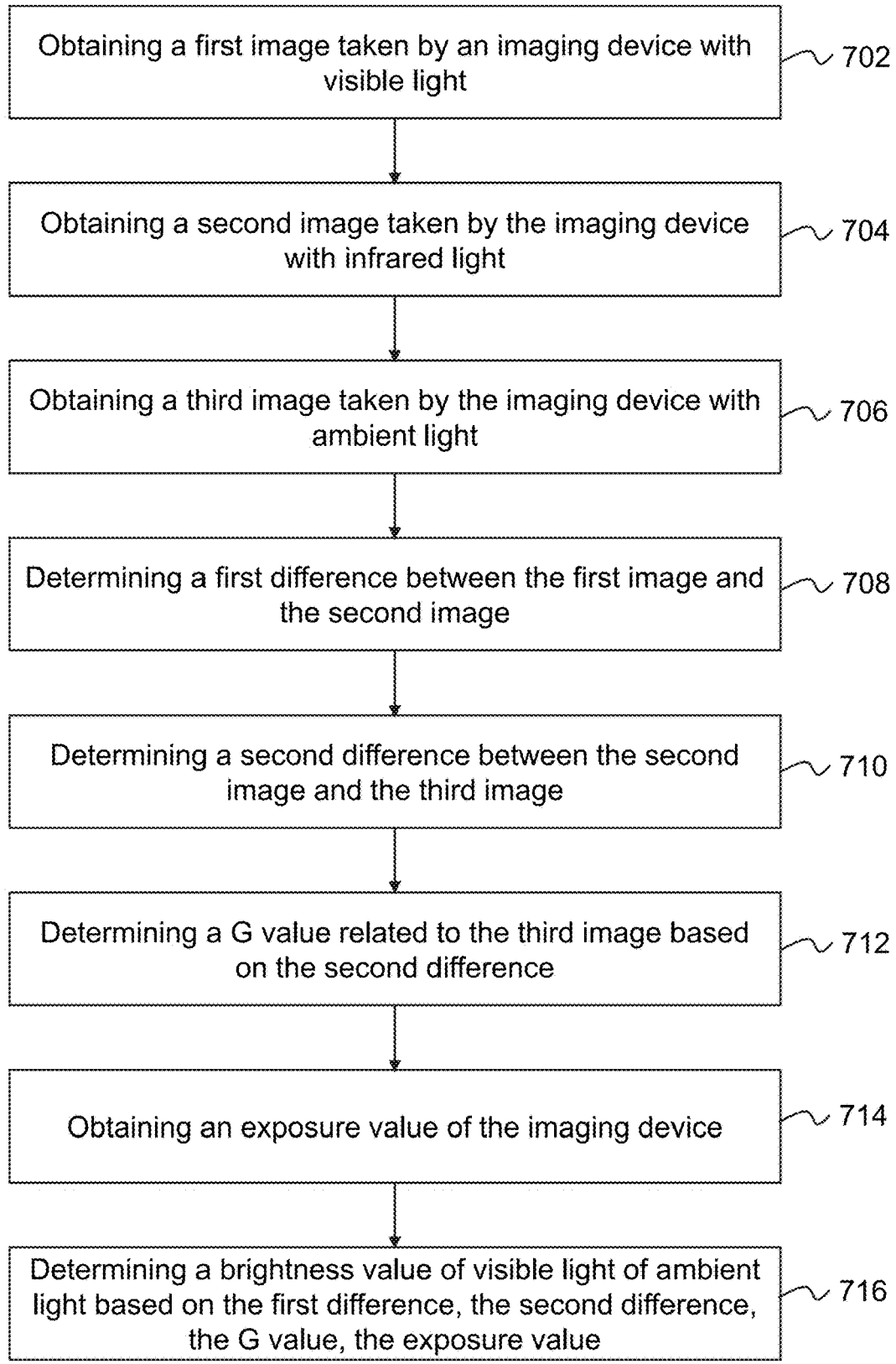
FIG. 7 is a flowchart of an exemplary process for determining a brightness value of visible light of ambient light according to some embodiments of the present disclosure.

FIG. 7 is a flowchart of an exemplary process for determining a brightness value of visible light of ambient light of an imaging device according to some embodiments of the present disclosure. In some embodiments, at least part of process 700 may be performed by the server 110 (implemented in, for example, the processor 201 of the computing device 200). In some embodiments, step 606 of the process 600 may be performed according to the process 700. In some embodiments, the imaging device may operate process 700 in the first operation mode, such as the night-operation mode, the day-operation mode described in connection with FIG. 6.

In 702, the acquisition unit 510 may obtain a first image captured by the imaging device with visible light. In some embodiments, the first image may be captured by the imaging device in an experimental environment only including visible light or reasonably close to only including a visible light. For example, the imaging device may be put in an enclosed space (e.g., a lamp house) with a visible light source (e.g., a fluorescent lamp). A gray plate may be put in front of the imaging device. In some embodiments, the first image may be captured by the imaging device and stored in a storage device (e.g., the storage device 140, the storage module 430). The acquisition unit 510 may obtain the first image from the storage device.

In 704, the acquisition unit 510 may obtain a second image captured by the imaging device with infrared light. In some embodiments, the second image may be captured by the imaging device in an experimental environment only including infrared light or reasonably close to only including an infrared light. For example, the imaging device may be put in a space without a visible light source (e.g., a fluorescent lamp) and having an infrared light source (e.g., infrared light). A gray plate may be put in front of the imaging device. In some embodiments, the second image may be captured by the imaging device and stored in storage device (e.g., the storage device 140, the storage module 430). The acquisition unit 510 may obtain the second image from the storage device.

In 706, the acquisition unit 510 may obtain a third image captured by the imaging device with ambient light. In some embodiments, the third image may be captured by the imaging device in a natural environment without light source explicitly supplied. In some embodiments, the third image may be captured by the imaging device and stored in storage device (e.g., the storage device 140, the storage module 430). The acquisition unit 510 may obtain the third image from the storage device.

The ambient light may include visible light and infrared light. The visible light and the infrared light may be described by RGB data. RGB is a color model including red, green, and blue color. The RGB data may include an R value, a G value, and/or a B value. The R value, the G value, and the B value may correspond to a value of red, a value of green, and a value of blue, respectively. The R value, the G value, and the B value may be any positive number between 0 and 255. The RGB data may be described as (R, G, B). For example, the RGB data corresponding to red may be (255, 0, 0). For illustration purposes, the RGB data of the visible light may be denoted as A ($R_a$, $G_a$, $B_a$), and the RGB data of the infrared light may be denoted as B ($R_b$, $G_b$, $B_b$). The RGB data of the ambient light including the visible light and the infrared light may be denoted as C ($R_c$, $G_c$, $B_c$). In some embodiments, the C ($R_c$, $G_c$, $B_c$) may be determined based on the RGB data of the visible light, the RGB data of infrared light, and proportions of the visible light and the infrared light in the ambient light according to Equation (2) or Equation (3) as below:

$$(R_c, G_c, B_c) = (R_a, G_a, B_a) + k_1 * (R_b, G_b, B_b) \quad \text{Equation(2)},$$

$$(R_c, G_c, B_c) = k_2 (R_a, G_a, B_a) + k_3 * (R_b, G_b, B_b) \quad \text{Equation(3)},$$

where $k_2$ refers to a proportion of the visible light in the ambient light, $k_3$ refers to a proportion of the infrared light in the ambient light, and $k_1$ refers to a ratio of the proportion of the visible light over the proportion of the infrared light in the ambient light.

In 708, the determination unit 520 may determine a first difference between the first image and the second image. In some embodiments, the first difference between the first image and the second image may be a Euclidean or Manhattan distance between the first image and the second image. The first difference may be determined based on the process 800 described elsewhere in this disclosure (e.g., FIG. 8 and the relevant descriptions).

In 710, the determination unit 520 may determine a second difference between the second image and the third image. In some embodiments, the second difference between the third image and the second image may be a Euclidean or Manhattan distance between the third image and the second image. The second difference may be determined based on the process 800 described elsewhere in this disclosure (e.g., FIG. 8 and the relevant descriptions).

In 712, the determination unit 520 may determine a G value related to the third image based on the second difference and the first difference. The G value of the third image associated with the ambient light may be denoted as $G_c$, which refers to the value of green of the ambient light. In some embodiments, the RGB data of the ambient light may be determined according to Equation (2). The first difference may be a first Euclidean distance between the first image and the second image. The second difference may be a second Euclidean distance between the second image and the third image. The relationship between the G value of the third image and the second Euclidean distance between the second image and the third image may be described according to Equations (4) as below:

$$G_c * x = G_c \sqrt{\left(\frac{R_c}{G_c} - \frac{R_b}{G_b}\right)^2 + \left(\frac{B_c}{G_c} - \frac{B_b}{G_b}\right)^2} \quad \text{Equations (4)}$$

$$= \sqrt{G_c^2 \left(\frac{R_c}{G_c} - \frac{R_b}{G_b}\right)^2 + G_c^2 \left(\frac{B_c}{G_c} - \frac{B_b}{G_b}\right)^2}$$

$$= \sqrt{\left(R_c - \frac{G_c R_b}{G_b}\right)^2 + \left(B_c - \frac{G_c B_b}{G_b}\right)^2}$$

$$= \sqrt{\left(R_a + kR_b - \frac{(G_a + kG_b)R_b}{G_b}\right)^2 + \left(B_a + kB_b - \frac{(G_a + kG_b)B_b}{G_b}\right)^2}$$

$$= \sqrt{\left(R_a + kR_b - \frac{G_a R_b}{G_b} - kR_b\right)^2 + \left(B_a + kB_b - \frac{G_a B_b}{G_b} - kB_b\right)^2}$$

$$= \sqrt{\left(R_a - G_a \frac{R_b}{G_b}\right)^2 + \left(B_a - G_a \frac{B_b}{G_b}\right)^2}$$

$$= G_a \sqrt{\left(\frac{R_a}{G_a} - \frac{R_b}{G_b}\right)^2 + \left(\frac{B_a}{G_a} - \frac{B_b}{G_b}\right)^2}$$

$$= d,$$

where x refers to the second Euclidean distance between the second image and the third image (will be described in FIG. 8), d refers to a product of the G value of the third image and the second distance, and $$\sqrt{\left(\frac{R_a}{G_a} - \frac{R_b}{G_b}\right)^2 + \left(\frac{B_a}{G_a} - \frac{B_b}{G_b}\right)^2}$$

refers to the first Euclidean distance between the first image and the second image.

According to Equation (4), the product of the G value of the third image and the second Euclidean distance between the second image and the third image; that is, d may be a constant. The G value of the third image may be determined according to Equation (5) as below:

$$G_c = \frac{d}{x} = \frac{G_a\sqrt{\left(\frac{R_a}{G_a} - \frac{R_b}{G_b}\right)^2 + \left(\frac{B_a}{G_a} - \frac{B_b}{G_b}\right)^2}}{x}. \quad \text{Equation (5)}$$

In some embodiments, if the ambient light does not include or includes insignificant or negligible infrared light, the first Euclidean distance between the first image and the second image may be equal to x (i.e., the second Euclidean distance between the second image and the third image), and the $G_c$ may equal to $G_a$. Accordingly, therefore the G value of the visible light is $G_a$.

In 714, the acquisition unit 510 may obtain an exposure value of the imaging device. The exposure value of the imaging device may include a gain, a shutter speed, an aperture size, sensitivity to light, or the like, or any combination thereof. In some embodiments, the exposure value of the imaging device may include the gain, the shutter speed, and the aperture size. In some embodiments, the exposure value of the imaging device may include the gain and the shutter speed.

In 716, the determination unit 520 may determine the brightness value of the visible light of the ambient light based on the first difference, the second difference, the G value, and the exposure value. In some embodiments, the determination of the brightness value of the visible light of the ambient light when the imaging device operates in different operation modes may be same with or different from each other.

When the imaging device operates in the night-operation mode, the brightness value of the visible light of the ambient light may be determined according to Equation (6) as below:

$$\text{Lum(night)=mean}(X*Gc)/(x\text{Pos}*\text{sht}*\text{gain}) \quad \text{Equation (6),}$$

where Lum(night) refers to the brightness value of the visible of the ambient light in the night-operation mode, X refers to the second difference between the second image and the third image, Gc refers to the G value related to the third image, mean(X*Gc) refers to the average product of X and Gc of a subset of blocks of the third image, xPos refers to the first difference between the first image and the second image (will be described in FIG. 8), sht refers to the shutter speed, gain refers to the gain of the imaging device.

In some embodiments, in step 702, the acquisition unit 510 may obtain a plurality of first images captured by the imaging device with visible light. In step 708, for each of the first images, the determination unit 520 may determine a first difference between the each of the first images and the second image. The xPos in Equation (6) may be the maximum value of the first differences between the first images and the second image In some embodiments, if the imaging device operates in an automatic aperture mode, the aperture size of the imaging device may be adjusted automatically according to different imaging scenarios. If the imaging device operates in the automatic aperture mode, the brightness value of the visible light of the ambient light in the night-operation mode may be determined according to Equation (7) as below:

$$\text{Lum(night)=mean}(X*Gc)/(x\text{Pos}*\text{sht}*\text{gain}*\text{iris}) \quad \text{Equation (7),}$$

where iris refers to the aperture size.

In some embodiments, the aperture of the imaging device may operate in a manual mode or an automatic mode. When the aperture operates imaging in the manual mode, the iris may have a constant value. The value of the iris may be any positive number, such as 1.

If the imaging device operates in the day-operation mode, the imaging device may not receive the infrared light of the ambient light due to the optical filter 150 having cut off the infrared light. The first image (i.e., the image captured by the imaging device with the visible light) and the third image (i.e., the image captured by the imaging device with the ambient light) may be the same. The second image (i.e., the image captured by the imaging device with the infrared light) may not be used to determine the brightness value of the visible of the ambient light. The brightness value of the visible light of the ambient light may be determined according to the first image or the third image if the optical filter 150 operates in the day-operation mode. For illustration purposes, the determination of the brightness value of the visible light of the ambient light based on the first image is described below as an example, and the determination may be based on the third image. The determination unit 520 may divide the first image into a plurality of blocks. The determination unit 520 may determine a subset of blocks from the plurality of blocks of the first image based on the brightness value of each block. For example, the subset of blocks may be the blocks whose brightness values are equal to or greater than a threshold. The determination unit 520 may also determine an average brightness value of the subset of blocks. In some embodiments, the brightness value of a block may be determined by the determination module 520 according to the RGB data of the block. For example, the determination module 520 may assign the R value, the G value, or the B value of the block as the brightness value of the block. As another example, the determination module 520 may convert the RGB data of the block to Luminance-Bandwidth-Chrominance (YUV) data, and determine the brightness value of the block based on the YUV data. For instance, the determination module 520 may assign the luma (i.e., Y) value as the brightness value of the block.

The brightness value of the visible light of the ambient light in the day-operation mode may be determined according to Equation (8) as below:

$$\text{Lum(day)}=ev/(\text{sht}*\text{gain}) \quad \text{Equation (8),}$$

where Lum(day) refers to the brightness value of the visible of the ambient light in the day-operation mode, ev refers to the average brightness value of the subset of blocks of the first image.

In some embodiments, if the imaging device operates in the automatic aperture mode, the brightness value of the visible light of the ambient light in the day-operation mode may be determined according to Equation (9) as below:

$$\text{Lum(day)}=ev/(\text{sht}*\text{gain}*\text{iris}) \quad \text{Equation (9),}$$

where iris refers to the aperture size.

It should be noted that the above descriptions of process 700 are provided for the purposes of illustration, and not intended to limit the scope of the present disclosure. For persons having ordinary skills in the art, various modifications and changes in the forms and details of the application of the above method and system may occur without departing from the principles of the present disclosure.

In some embodiments, one or more operations may be added or omitted. For example, 704 may be omitted in the day-operation mode of the optical filter 150. In some embodiments, the order of two or more operations may be changed. For example, 702, 704, and 706 may be performed simultaneously. As another example, 706 may be performed before 702 and 704. In some embodiments, the first difference and the second difference may be determined based on another color model, such as a Hue-Saturation-Value (HSV)

model, an HTML color model, a Hex triplet model, or the like, or any combination thereof. In some embodiments, the first difference and the second difference may be determined based on other parameters, such as an RGB vector angel, an HSV Euclidean Distance, an HSV Manhattan Distance or the like, or any combination thereof. However, those variations and modifications also fall within the scope of the present disclosure.

Figure 8:
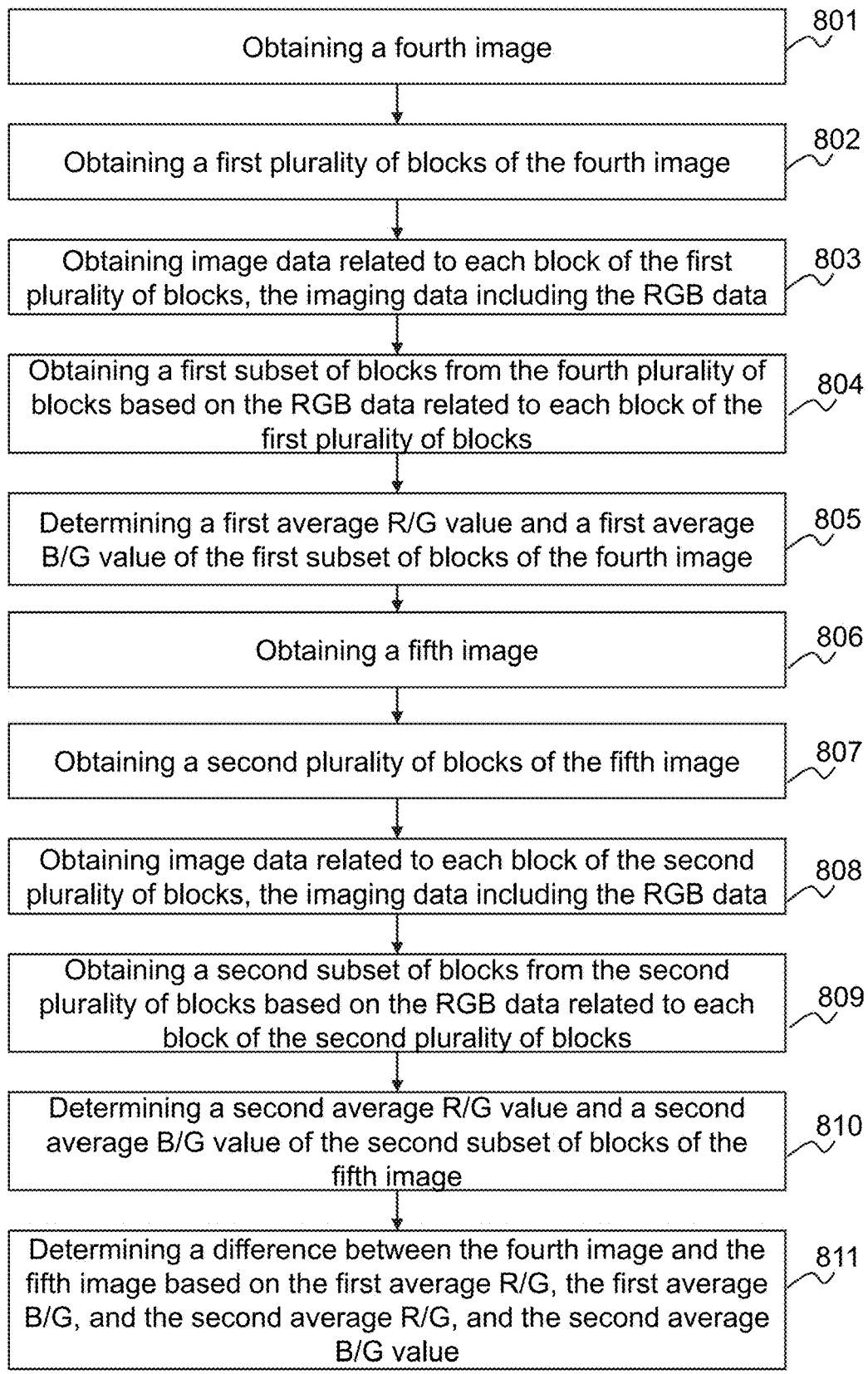
FIG. 8 is a flowchart of an exemplary process for determining a difference between two images according to some embodiments of the present disclosure.

FIG. 8 is a flowchart of an exemplary process for determining a difference between two images according to some embodiments of the present disclosure.

In some embodiments, at least part of process 800 may be performed by the server 110 (implemented in, for example, the processor 201 of the computing device 200 shown in FIG. 2). In some embodiments, step 708 and/or step 710 of the process 700 may be performed according to one or more operations in the process 800. In some embodiments, the two images may be any two of an image captured by an imaging device with visible light, an image captured by the imaging device with infrared light, and an image captured by the imaging device with ambient light described elsewhere in this disclosure (e.g., FIG. 7 and the relevant descriptions).

In 801, the acquisition unit 510 may obtain a fourth image. The fourth image may be an image captured by an imaging device (e.g., the image acquisition device 130). For example, the fourth image may be an image captured by the imaging device with visible light, infrared light, or ambient light. The ambient light may include visible light and infrared light. More descriptions regarding the image captured by the imaging device with visible light, infrared light, or ambient light may be found elsewhere of the present disclosure (e.g., FIG. 7 and the relevant descriptions). In some embodiments, the acquisition unit 510 may access a component in the image acquisition system 100, such as the storage device 140 or the storage module 430, and obtain the fourth image previously captured by the imaging device and stored therein.

In 802, the acquisition unit 510 may obtain a first plurality of blocks of the first image. For example, the acquisition unit 510 may divide the fourth image into the first plurality of blocks. The sizes of the first plurality of blocks may be same with or different from each other. The first image may be divided into M*N blocks. The M and N may be any positive number, respectively. In some embodiments, the first plurality of block may be divided from a sub-region of the fourth image.

In 803, the acquisition unit 510 may obtain image data related to each block of the first plurality of blocks of the fourth image. The image data may include RGB data related to each block of the plurality of blocks of the fourth image.

In some embodiments, a block may include one or more pixels. The determination unit 520 may determine the RGB data of the block based on RGB data of the one or more pixels in the block. For example, the RGB data of the block may be equal to an average value of the RGB data of the one or more pixels in the block.

In 804, the acquisition unit 510 may obtain a first subset of blocks from the first plurality of blocks based on the RGB data related to each block of the first plurality of blocks. In some embodiments, the first subset of blocks may be selected from the first plurality of blocks based on the RGB data of the first plurality of blocks and an RGB threshold. The RGB threshold may include an R value threshold, a G value threshold, or a B value threshold. The R value threshold, G value threshold, or B value threshold may be any number that is between 0 and 255. The RGB threshold may be a default parameter stored in a storage device or a parameter set by a user of the image acquisition system 100 via the image acquisition device 130. Alternatively, the RGB threshold may be determined by one or more components (e.g., the server 110) of the image acquisition system 100 based on the RGB data of the first plurality of blocks. Merely by way of example, the RGB threshold may be an average R value of the first plurality of blocks.

In some embodiments, the first subset of blocks may be the blocks whose RGB data are equal to or smaller than the RGB threshold. For illustration purposes, assuming that the RGB threshold is an R value threshold, the first subset of blocks may be the block(s) whose R value(s) is equal to or smaller than the R value threshold. In some embodiments, the first subset of blocks may be selected from the first plurality of blocks based on the RGB data of the first plurality of blocks and a plurality of RGB thresholds. In some embodiments, the first subset of blocks may be selected from the first plurality of blocks randomly.

In 805, the determination unit 520 may determine a first average R/G value and/or a first average B/G value of the first subset of blocks based on the RGB data of each block of the first subset of blocks. The R/G value may be a ratio of the R value to the G value. The B/G value may be a ratio of the B value to the G value. The first average R/G value may be determined based on the R/G value of each block of the first subset of blocks. The first average B/G value may be determined based on the B/G value of each block of the first subset of blocks.

In 806, the acquisition unit 510 may obtain a fifth image. The fifth image may be an image captured by the imaging device with visible light, infrared light, or ambient light. The fifth image and the first image may be captured by the imaging device with different types of light. In some embodiments, the acquisition unit 510 may access a component of the image acquisition system 100, such as the storage device 140 or the storage module 430, and obtain the fifth image previously captured by the imaging device and stored therein. Step 806 may be performed in a similar manner with 801, and the detailed description is not repeated here.

In 807, the acquisition unit 510 may obtain a second plurality of blocks of the second image. For example, the acquisition unit 510 may divide the fifth image into the plurality of second blocks. In some embodiments, the acquisition unit 510 may obtain the second plurality of blocks from a sub-region of the fifth image. Step 807 may be performed in a similar manner with 802, and the detailed description is not repeated here.

In 808, the acquisition unit 510 may obtain image data related to each block of the second plurality of blocks of the second image. The image data may include RGB data related to each block of the second plurality of blocks of the fifth image. Step 808 may be performed in a similar manner with 803, and the detailed description is not repeated here.

In 809, the acquisition unit 510 may obtain a second subset of blocks from the second plurality of blocks based on the RGB data related to each block of the second plurality of blocks. In some embodiments, the second subset of blocks may include one or more blocks whose RGB data (e.g., an R value) is equal to or smaller than an RGB threshold (e.g., an R value threshold). In some embodiments, the second subset of blocks may be selected from the second plurality of blocks randomly. Step 809 may be performed in a similar manner with 804, and the detailed description is not repeated here.

In 810, the determination unit 520 may determine a second average R/G value and/or a second average B/G value of the second subset of blocks based on the RGB data of each block of the second subset of blocks. Step 810 may be performed in a substantially similar manner with 805 and is the detailed description not repeated here.

In 811, the determination unit 520 may determine a difference between the fourth image and the fifth image based on the first average R/G value, the first average B/G value, the second average R/G, and the second average B/G value. In some embodiments, the difference between the fourth image and the fifth image may be a Euclidean or a Manhattan distance between the fourth image and the fifth image. The Manhattan distance may be determined according to Equation (10) as below:

$$D1 = |\text{avg\_R/G}(1) - \text{avg\_R/G}(2)| + |\text{avg\_B/G}(1) - \text{avg\_B/G}(2)| \quad \text{Equation (10),}$$

where D1 refers to the Manhattan distance, avg_R/G(1) refers to the first average R/G value of the fourth image, avg_R/G(2) refers to the second average R/G value of the fifth image, avg_B/G(1) refers to the first average B/G value of the fourth image, and avg_B/G(2) is the fifth average B/G value of the fifth image.

The Euclidean distance may be determined according to Equation (11) as below:

$$D2 = \sqrt{(\text{avg\_R/G}(1) - \text{avg\_R/G}(2))^2 + (\text{avg}B/G(1) - \text{avg\_B/G}(2))^2}, \quad \text{Equation (11)}$$

where D2 refers to the Euclidean distance.

It should be noted that the above descriptions of process 800 are provided for the purposes of illustration, and not intended to limit the scope of the present disclosure. For persons having ordinary skills in the art, various modifications and changes in the forms and details of the application of the above method and system may occur without departing from the principles of the present disclosure.

In some embodiments, one or more operations may be added or omitted. In some embodiments, the order of two or more operations may be changed. For example, 801 and 806 may be performed simultaneously. As another example, 806 may be performed before 801. In some embodiments, the difference between the first image and the fifth image may be determined based on another color model, such as a Hue-Saturation-Value (HSV) model, an HTML color model, a Hex triplet model, or the like, or any combination thereof. In some embodiments, the difference between the fourth image and the fifth image may be determined based on other parameters, such as an RGB vector angel, an HSV Euclidean Distance, an HSV Manhattan Distance or the like, or any combination thereof. However, those variations and modifications also fall within the scope of the present disclosure.

Figure 9:
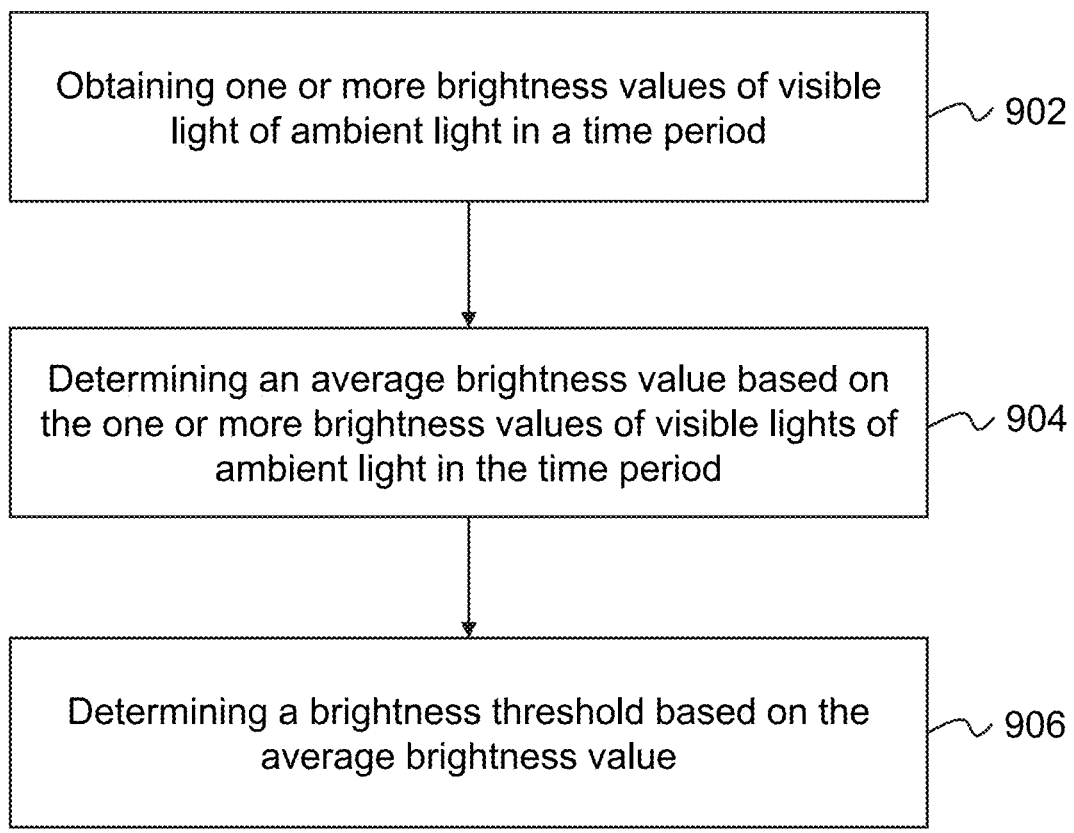
FIG. 9 is a flowchart of an exemplary process for determining a brightness threshold according to some embodiments of the present disclosure.

FIG. 9 is a flowchart of an exemplary process for determining a brightness threshold related to an operation mode according to some embodiments of the present disclosure. In some embodiments, at least part of process 900 may be performed by the server 110 (implemented in, for example, the processor 201 of the computing device 200 shown in FIG. 2). In some embodiments, step 606 of the process 600 may be performed based on the process 900 for determining a brightness threshold related to the first operation mode.

In 902, the acquisition unit 510 may obtain one or more brightness values of visible light of ambient light in a period. The period may be any continuous period when the optical filter 150 operates in the operation mode. The duration of the period may be 30 seconds, 1 minute, 3 minutes, or any other number. In some embodiments, the one or more brightness values of the visible light of the ambient light may be determined according to the process 700 described in connection with FIG. 7.

In 904, the determination unit 520 may determine an average brightness value based on the one or more brightness values of the visible light of the ambient light in the period.

In 906, the determination unit 520 may determine the brightness threshold based on the average brightness value. For example, the brightness threshold may be determined by multiplying the average brightness value of the visible light of the ambient light by a preset coefficient. The preset coefficient may be any positive number greater than 1, such as 1.1, 1.2. In some embodiments, the preset coefficient may be a default parameter stored in a storage device (e.g., the storage device 140) or a parameter set by a user of the imaging device.

It should be noted that the above descriptions of process 900 are provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure. For example, in 904, the determination unit 520 may determine another brightness value (e.g., a median value) of the one or more brightness values of the visible light of the ambient light in the period. In 906, the determination unit 520 may determine the brightness threshold based on the brightness value.

Figure 10:
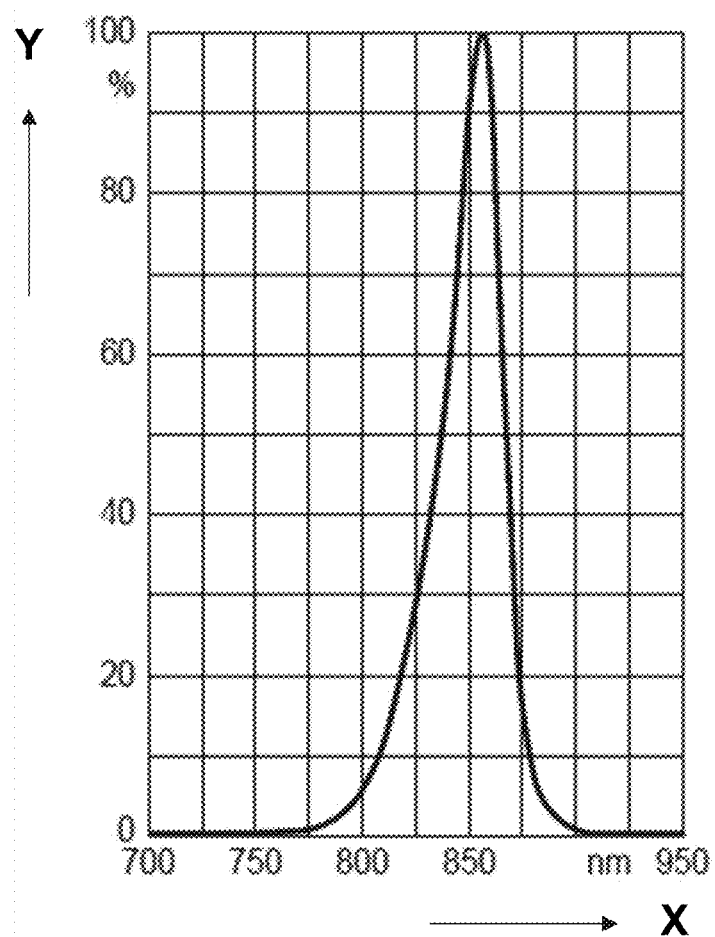
FIG. 10 is a schematic diagram of an exemplary spectrum of infrared light according to some embodiments of the present disclosure.

FIG. 10 is a schematic diagram of an exemplary spectrum of infrared light according to some embodiments of the present disclosure. In the spectrum, the x-axis refers to a wavelength of the infrared light, and the y-axis refers to an infrared light absorbance. As shown in FIG. 10, the wavelength of the infrared light is in the range of 775 nm to 900 nm. The wavelength of the infrared light corresponding to the peak of the spectrum is greater than 850 nm and less than 875 nm.

Figure 11:
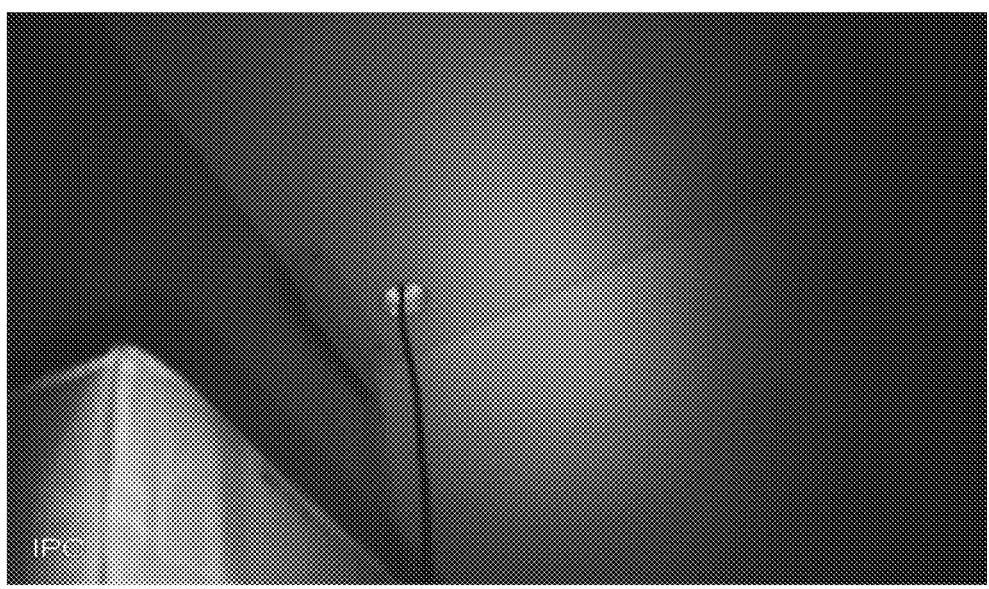
FIG. 11 is a schematic diagram of an exemplary image captured by an imaging device according to some embodiments of the present disclosure.

FIG. 11 is an image captured by an imaging device according to some embodiments of the present disclosure. The image illustrated in FIG. 11 corresponds to a scene A.

Figure 12:
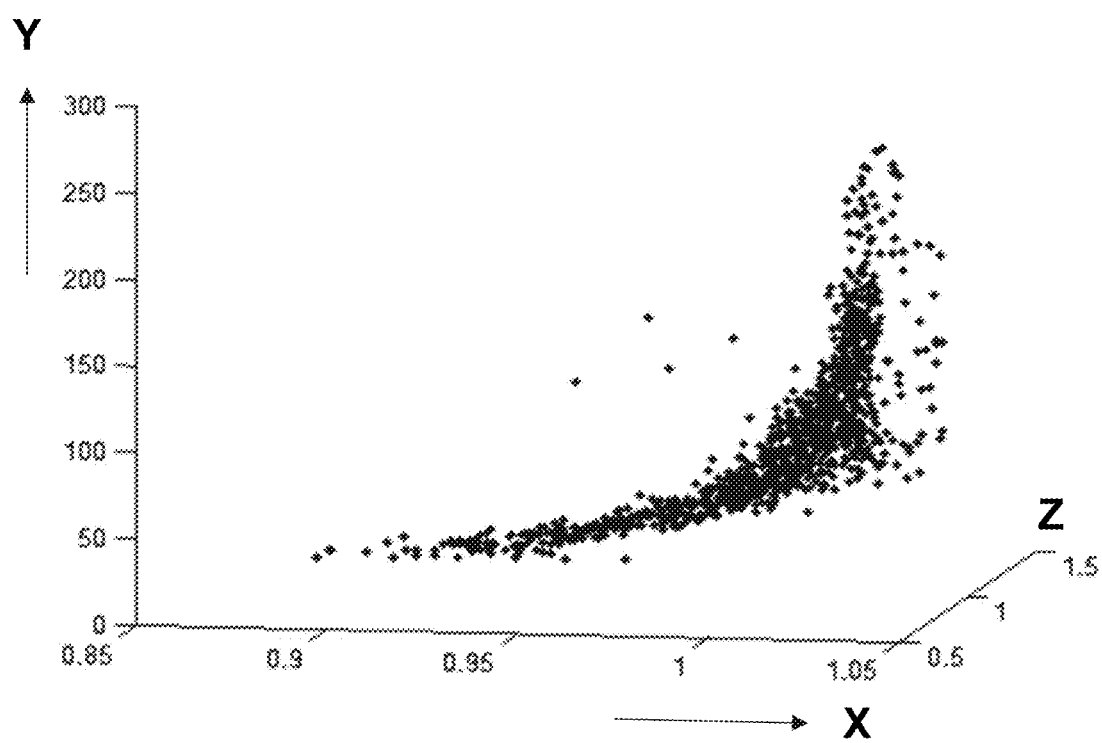
FIG. 12 is schematic diagram illustrating a distribution of RGB data corresponding to the image illustrated in FIG. 11 according to some embodiments of the present disclosure.

FIG. 12 is schematic diagram illustrating a distribution of RGB data corresponding to the image illustrated in FIG. 11 according to some embodiments of the present disclosure. The points corresponding to blocks in the image of the scene A illustrated in FIG. 11. Each block in the image of the scene A may include a plurality of pixels. The RGB value of a block may be an average value of the RGB values of the plurality pixels in the block. The x-axis refers to an R/G value of the block. The y-axis refers to a B/G value of the block. The z-axis refers to a G value of the block. The image of the scene A illustrated in FIG. 11 may be regarded as the third image related to ambient light described in connection with FIGS. 1 and 6.

Figure 13:
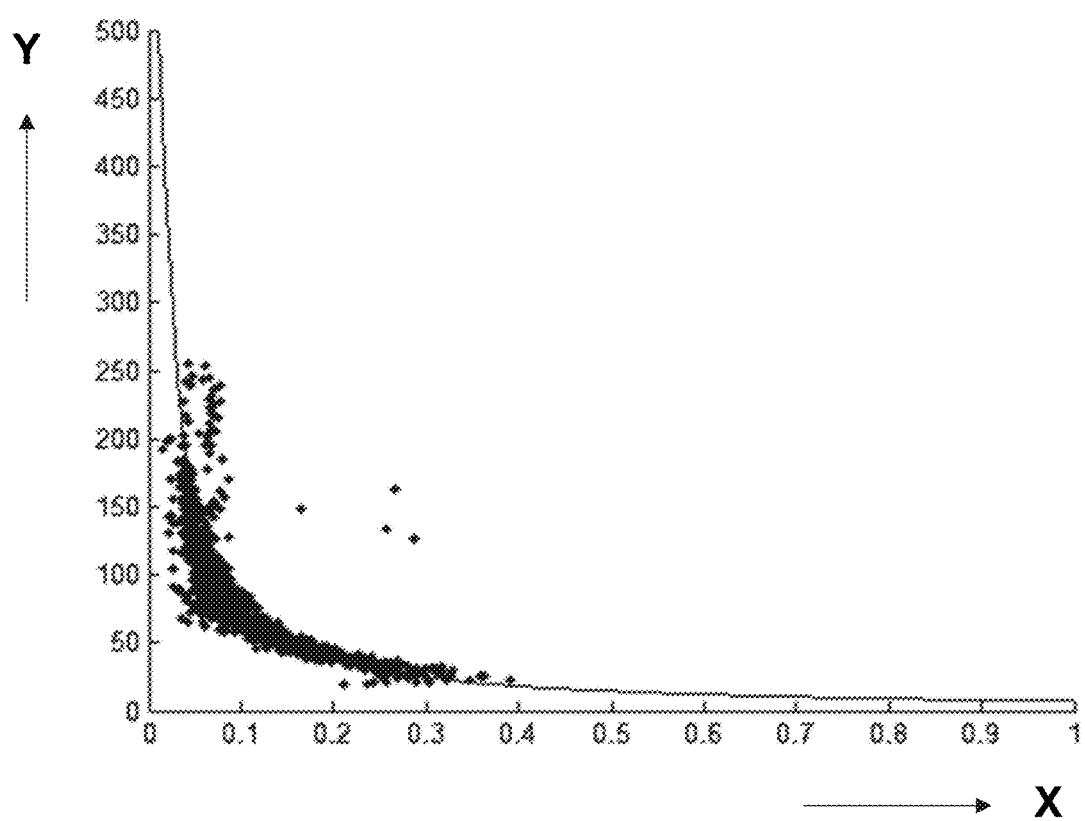
FIG. 13 is schematic diagram illustrating a relationship between a G value of the image of FIG. 11 and a difference between the image illustrated in FIG. 11 and an image related to infrared light according to some embodiments of the present disclosure.

FIG. 13 is a schematic diagram illustrating a relationship between G value of the image illustrated in FIG. 11 and a difference between the image illustrated in FIG. 11 and an image related to infrared light according to some embodiments of the present disclosure. The image related to infrared light is captured by the same imaging device with the image of scene A. The image related to infrared light is captured in an experimental environment only including infrared light or reasonably close to only including infrared light described elsewhere in this disclosure (e.g., FIG. 7 and the relevant descriptions). The difference between the image of the scene A and the image related to infrared light is a Euclidean distance between the two scenes.

As shown in FIG. 13, the x-axis refers to the difference between the image of the scene A and the image related to infrared light. The y-axis refers to the G value of the image of the scene A. The G value of the image of the scene A is roughly negative correlated to the difference between the scene A and the scene related to infrared light.

It should be noted that the above descriptions of FIGS. 10-13 are provided for the purposes of illustration, and not intended to limit the scope of the present disclosure. For persons having ordinary skills in the art, various modifications and changes in the forms and details of the application of the above method and system may occur without departing from the principles of the present disclosure. For example, the RGB data of the scene A may be distributed in any pattern. However, those variations and modifications also fall within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for changing an operation mode of an optical filter of an imaging device, comprising:
   a storage device storing a set of instructions;
   at least one processor in communication with the storage device, wherein when executing the set of instructions, the at least one processor is configured to cause the system to:
   obtain a first operation mode of the optical filter;
   determine a brightness value of visible light of ambient light, the ambient light including infrared light and the visible light;
   obtain a brightness threshold related to the first operation mode;
   compare the brightness value of the visible light of the ambient light with the brightness threshold;
   determine whether a switching condition is satisfied based on the comparison result; and
   in response to the determination that the switching condition is satisfied, switch the first operation mode of the optical filter to a second operation mode, wherein to determine the brightness value of the visible light of the ambient light, the at least one processor is further configured to cause the system to:
      obtain a first image captured by the imaging device with visible light, a second image captured by the imaging device with infrared light, and a third image captured by the imaging device with the ambient light;
      obtain an exposure value of the imaging device; and
      determine the brightness value of the visible light of the ambient light based on the first image, the second image, the third image, and the exposure value.

2. The system of claim 1, wherein to determine the brightness value of the visible light of the ambient light based on the first image, the second image, the third image, and the exposure value, the at least one processor is further configured to cause the system to:
   determine a first difference between the first image and the second image;
   determine a second difference between the second image and the third image;
   determine a G value related to the third image based on the second difference;
   determine the brightness value of the visible light of the ambient light based on the first difference, the second difference, the G value, the exposure value.

3. The system of claim 2, wherein the first difference between the first image and the second image is a Euclidean or Manhattan distance between the first image and the second image, and
   the second difference between the second image and the third image is a Euclidean or a Manhattan distance between the second image and the third image.

4. The system of claim 2, wherein to determine the first difference between the first image and the second image, the at least one processor is further configured to cause the system to:
   obtain a first plurality of blocks of the first image;
   obtain RGB data related to each block of the first plurality of blocks;
   obtain a first subset of blocks from the first plurality of blocks based on the RGB data related to each block of the first plurality of blocks;
   determine a first average R/G value and a first average B/G value of the first subset of blocks of the first image;
   obtain a second plurality of blocks of the second image;
   obtain RGB data related to each block of the second plurality of blocks;
   obtain a second subset of blocks from the second plurality of blocks based on the RGB data related to each block of second plurality of blocks;
   determine a second average R/G value and a second average B/G value of the second subset of blocks of the second image; and
   determine the first difference between the first image and the second image based on the first average R/G, the first average B/G, the second average R/G, and the second average B/G value.

5. The system of claim 2, wherein to determine the second difference between the third image and the second image, the at least one processor is further configured to cause the system to:
   obtain a third plurality of blocks of the third image;
   obtain RGB data related to each block of the third plurality of blocks;
   obtain a third subset of blocks from the third plurality of blocks based on the RGB data related to each block of the third plurality of blocks;
   determine a third average R/G value and a third average B/G value of the third subset of blocks of the third image; and
   determine the second difference between the second image and the third image based on the second average R/G, the second average B/G, the third average R/G, and the third average B/G value.

6. The system of claim 1, wherein the exposure value of the imaging device comprises at least one of a shutter speed, a gain, or an aperture size.

7. The system of claim 1, wherein to obtain the brightness threshold related to the first operation mode based on the brightness value of the visible light of the ambient light, the at least one processor is further configured to cause the system to:

obtain one or more brightness values of the visible light of the ambient light in a first period;

determine an average brightness value of the one or more brightness values of the visible light of the ambient light; and determine the brightness threshold based on the average brightness value of the one or more brightness values of the visible light of the ambient light.

8. The system of claim 1, wherein the first operation mode of the optical filter is a day-operation mode or a night-operation mode.

9. The system of claim 8, wherein
the first operation mode of the optical filter is the night-operation mode, and
to determine whether the switching condition is satisfied, the at least one processor is further configured to cause the system to:
obtain a plurality of brightness values of the visible light of the ambient light in a second period;
determine, among the plurality of brightness values of the visible light of the ambient light in the second period, a first number of brightness values of the visible light of the ambient light exceeding or being equal to the brightness threshold;
determine whether the first number is equal to or greater than a first number threshold; and
in response to the determination that the first number is equal to or greater than the first number threshold, switch the night-operation mode of the optical filter to the day-operation mode.

10. The system of claim 8, wherein
the first operation mode of the optical filter is the day-operation mode, and
to determine whether the switching condition is satisfied, the at least one processor is further configured to cause the system to:
obtain a plurality of brightness values of the visible light of the ambient light in a third period;
determine, among the plurality of brightness values of the visible light of the ambient light in the third period, a second number of brightness values of the visible light of the ambient light below the brightness threshold;
determine whether the second number is equal to or greater than a second number threshold; and
in response to the determination that the second number is equal to or greater than the second number threshold, switch the day-operation mode of the optical filter to the night-operation mode.

11. A method, comprising:
obtaining a first operation mode of an optical filter of an imaging device;
determining a brightness value of visible light of ambient light, the ambient light including infrared light and the visible light;
obtaining a brightness threshold related to the first operation mode;
comparing the brightness value of the visible light of the ambient light with the brightness threshold;
determining whether a switching condition is satisfied based on the comparison result; and
in response to the determination that the switching condition is satisfied, switching the first operation mode of the optical filter to a second operation mode, wherein the determining the brightness value of the visible light of the ambient light comprises:

obtaining a first image captured by the imaging device with visible light, a second image captured by the imaging device with infrared light, and a third image captured by the imaging device with the ambient light;

obtaining an exposure value of the imaging device; and determine the brightness value of the visible light of the ambient light based on the first image, the second image, the third image, and the exposure value.

12. The method of claim 11, wherein the determining the brightness value of the visible light of the ambient light based on the first image, the second image, the third image, and the exposure value further comprises:

determining a first difference between the first image and the second image;

determining a second difference between the second image and the third image;

determining a G value related to the third image based on the second difference;

determining the brightness value of the visible light of the ambient light based on the first difference, the second difference, the G value, the exposure value.

13. The method of claim 12, wherein the first difference between the first image and the second image is a Euclidean or Manhattan distance between the first image and the second image, and
the second difference between the second image and the third image is a Euclidean or a Manhattan distance between the second image and the third image.

14. The method of claim 12, wherein the determining the first difference between the first image and the second image further comprises:
obtaining a first plurality of blocks of the first image;
obtaining RGB data related to each block of the first plurality of blocks;
obtaining a first subset of blocks from the first plurality of blocks based on the RGB data related to each block of the first plurality of blocks;
determining a first average R/G value and a first average B/G value of the first subset of blocks of the first image;
obtaining a second plurality of blocks of the second image;
obtaining RGB data related to each block of the second plurality of blocks;
obtaining a second subset of blocks from the second plurality of blocks based on the RGB data related to each block of second plurality of blocks;
determining a second average R/G value and a second average B/G value of the second subset of blocks of the second image; and
determining the first difference between the first image and the second image based on the first average R/G, the first average B/G, the second average R/G, and the second average B/G value.

15. The method of claim 12, wherein the determining the second difference between the third image and the second image further comprises:
obtaining a third plurality of blocks of the third image;
obtaining RGB data related to each block of the third plurality of blocks;
obtaining a third subset of blocks from the third plurality of blocks based on the RGB data related to each block of the third plurality of blocks;

determining a third average R/G value and a third average B/G value of the third subset of blocks of the third image; and determining the second difference between the second image and the third image based on the second average R/G, the second average B/G, the third average R/G, and the third average B/G value.

16. The method of claim 11, wherein the obtaining the brightness threshold related to the first operation mode based on the brightness value of the visible light of the ambient light further comprises:

obtaining one or more brightness values of the visible light of the ambient light in a first period;

determining an average brightness value of the one or more brightness values of the visible light of the ambient light; and determining the brightness threshold based on the average brightness value of the one or more brightness values of the visible light of the ambient light.

17. The method of claim 11, wherein the first operation mode of the optical filter is a day-operation mode or a night-operation mode.

18. The method of claim 17, wherein
the first operation mode of the optical filter is the night-operation mode, and
the determining whether the switching condition is satisfied further comprises:

obtaining a plurality of brightness values of the visible light of the ambient light in a second period;

determining, among the plurality of brightness values of the visible light of the ambient light in the second period, a first number of brightness values of the visible light of the ambient light exceeding or being equal to the brightness threshold;

determining whether the first number is equal to or greater than a first number threshold; and in response to the determination that the first number is equal to or greater than the first number threshold, switching the night-operation mode of the optical filter to the day-operation mode.

19. The method of claim 17, wherein
the first operation mode of the optical filter is the day-operation mode, and
the determining whether the switching condition is satisfied further comprises:

obtaining a plurality of brightness values of the visible light of the ambient light in a third period;

determining, among the plurality of brightness values of the visible of the ambient light in the third period, a second number of brightness values of the visible light of the ambient light below the brightness threshold;

determining whether the second number is equal to or greater than a second number threshold; and in response to the determination that the second number is equal to or greater than the second number threshold, switching the day-operation mode of the optical filter to the night-operation mode.

20. A non-transitory computer-readable storage medium including instructions that, when executed by at least one processor of a system, causes the system to perform a method, the method comprising:

obtaining a first operation mode of an optical filter of an imaging device;

determining a brightness value of visible light of ambient light, the ambient light including infrared light and the visible light;

obtaining a brightness threshold related to the first operation mode;

comparing the brightness value of the visible light of the ambient light with the brightness threshold;

determining whether a switching condition is satisfied based on the comparison result; and in response to the determination that the switching condition is satisfied, switching the first operation mode of the optical filter to a second operation mode, wherein the determining the brightness value of the visible light of the ambient light further comprising:

obtaining a first image captured by the imaging device with visible light;

obtaining a second image captured by the imaging device with infrared light;

obtaining a third image captured by the imaging device with the ambient light;

determining a first difference between the first image and the second image;

determining a second difference between the second image and the third image;

determining a G value related to the third image based on the second difference;

obtaining an exposure value of the imaging device; and determining the brightness value of the visible light of the ambient light based on the first difference, the second difference, the G value, the exposure value.

* * * * *